(12) United States Patent
Cholas et al.

(10) Patent No.: US 8,300,541 B2
(45) Date of Patent: Oct. 30, 2012

(54) APPARATUS AND METHODS FOR UTILIZING STATISTICAL MULTIPLEXING TO ENSURE QUALITY OF SERVICE IN A NETWORK

(75) Inventors: Chris Cholas, Frederick, CO (US);
Charles A. Hasek, Broomfield, CO (US)

(73) Assignee: Time Warner Cable Inc., New York, NY (US)

( * ) Notice: Subject to any disclaimer, the term of this patent is extended or adjusted under 35 U.S.C. 154(b) by 564 days.

(21) Appl. No.: 12/070,666

(22) Filed: Feb. 19, 2008

(65) Prior Publication Data

US 2009/0207866 A1 Aug. 20, 2009

(51) Int. Cl.
*G01R 31/08* (2006.01)

(52) U.S. Cl. .................. 370/252; 725/110; 725/151

(58) Field of Classification Search .......... 370/200–253, 370/539, 522, 395.1, 396, 397, 468, 535–537, 370/96; 725/121, 100, 32, 118, 110–113, 725/151–153; 455/418–420; 709/203, 206
See application file for complete search history.

(56) References Cited

U.S. PATENT DOCUMENTS

| | | |
|---|---|---|
| 4,760,442 A | 7/1988 | O'Connell et al. |
| 5,208,692 A | 5/1993 | McMahon |
| 5,488,609 A | 1/1996 | Hluchyj et al. |
| 5,581,544 A | 12/1996 | Hamada et al. |
| 5,594,491 A | 1/1997 | Hodge et al. |
| 5,682,195 A | 10/1997 | Hendricks et al. |
| 5,708,664 A | 1/1998 | Budge et al. |
| 5,708,961 A | 1/1998 | Hylton et al. |
| 5,825,779 A | 10/1998 | Putnins et al. |
| 5,826,166 A | 10/1998 | Brooks et al. |
| 5,862,140 A | 1/1999 | Shen |
| 5,944,795 A | 8/1999 | Civanlar |
| 5,956,088 A | 9/1999 | Shen |
| 6,005,620 A | 12/1999 | Yang |
| 6,014,369 A * | 1/2000 | Takahasahi ................. 370/248 |
| 6,038,256 A | 3/2000 | Linzer |
| 6,052,384 A | 4/2000 | Huang |
| 6,118,976 A | 9/2000 | Arias et al. |
| 6,167,432 A | 12/2000 | Jiang |
| 6,192,083 B1 | 2/2001 | Linzer |
| 6,219,358 B1 | 4/2001 | Pinder et al. |
| 6,219,710 B1 | 4/2001 | Gray et al. |
| 6,259,733 B1 | 7/2001 | Kaye |
| 6,285,716 B1 | 9/2001 | Knee et al. |

(Continued)

FOREIGN PATENT DOCUMENTS

WO WO 01/10125 2/2001

*Primary Examiner* — Pao Sinkantarakorn
*Assistant Examiner* — Iqbal Zaidi
(74) *Attorney, Agent, or Firm* — Gazdzinski & Associates, PC

(57) ABSTRACT

Methods and apparatus for utilizing bitrate or other data associated with statistically multiplexed video (e.g., programs) or other content within a network to ensure quality of service (QoS) at a subscriber premises or local network. In one embodiment, the present invention provides improved multiplexing apparatus and methods that allow a consumer premises device to obtain QoS data and employ that data to enforce and maintain one or more QoS policies. In another embodiment of the present invention, an improved consumer premises device is provided which is adapted to receive a multiplexed program stream and subsequently demultiplex and time stamp the resulting single program streams. The time stamps are then utilized to generate QoS data which is utilized to enforce and maintain a QoS policy. Business methods associated with the various features described above are also disclosed.

26 Claims, 14 Drawing Sheets

U.S. PATENT DOCUMENTS

| | | | |
|---|---|---|---|
| 6,577,682 B1 | 6/2003 | Brightwell et al. | |
| 6,674,804 B1 | 1/2004 | Eshet | |
| 6,785,558 B1 | 8/2004 | Stratford et al. | |
| 6,792,045 B2 | 9/2004 | Matsumura et al. | |
| 6,795,506 B1 * | 9/2004 | Zhang et al. | 375/240.26 |
| 6,813,270 B1 | 11/2004 | Oz | |
| 6,856,786 B2 | 2/2005 | Belostotsky et al. | |
| 6,894,973 B1 | 5/2005 | Mishra | |
| 6,909,726 B1 | 6/2005 | Sheeran | |
| 6,937,619 B1 | 8/2005 | Strasman | |
| 6,959,042 B1 | 10/2005 | Liu et al. | |
| 6,963,544 B1 | 11/2005 | Balachandran | |
| 7,009,997 B2 | 3/2006 | Huang | |
| 7,012,891 B1 | 3/2006 | Chandran et al. | |
| 7,016,337 B1 | 3/2006 | Wu | |
| 7,027,460 B2 | 4/2006 | Iyer et al. | |
| 7,058,087 B1 * | 6/2006 | Oz et al. | 370/486 |
| 7,068,724 B1 | 6/2006 | Hamilton | |
| 7,092,356 B2 | 8/2006 | Rabic et al. | |
| 7,130,310 B2 | 10/2006 | Itawaki et al. | |
| 7,162,531 B2 | 1/2007 | Paz | |
| 7,173,947 B1 | 2/2007 | Ramakrishnan | |
| 7,174,384 B2 | 2/2007 | Cheung et al. | |
| 7,174,385 B2 | 2/2007 | Li | |
| 7,228,154 B2 | 6/2007 | Champion et al. | |
| 7,254,608 B2 | 8/2007 | Yeager et al. | |
| 7,266,133 B2 | 9/2007 | Wu et al. | |
| 7,283,803 B2 | 10/2007 | Karaoguz et al. | |
| 7,292,602 B1 | 11/2007 | Liu et al. | |
| 7,325,073 B2 | 1/2008 | Shao et al. | |
| 7,333,515 B1 | 2/2008 | Ramakrishnan | |
| 7,376,130 B2 | 5/2008 | Farmwald | |
| 7,376,386 B2 | 5/2008 | Phillips et al. | |
| 7,499,462 B2 | 3/2009 | MacMullan et al. | |
| 7,602,820 B2 | 10/2009 | Helms et al. | |
| 2001/0055336 A1 | 12/2001 | Krause et al. | |
| 2002/0032754 A1 | 3/2002 | Logston et al. | |
| 2002/0059619 A1 | 5/2002 | Lebar | |
| 2002/0085584 A1 | 7/2002 | Itawaki et al. | |
| 2002/0087995 A1 | 7/2002 | Pedlow | |
| 2002/0129374 A1 | 9/2002 | Freeman et al. | |
| 2002/0147771 A1 | 10/2002 | Traversat et al. | |
| 2002/0152299 A1 | 10/2002 | Traversat et al. | |
| 2002/0162109 A1 | 10/2002 | Shteyn | |
| 2003/0002577 A1 | 1/2003 | Pinder | |
| 2003/0007516 A1 | 1/2003 | Abramov et al. | |
| 2003/0056217 A1 | 3/2003 | Brooks | |
| 2003/0083054 A1 * | 5/2003 | Francesca et al. | 455/418 |
| 2003/0118014 A1 | 6/2003 | Iyer et al. | |
| 2003/0217362 A1 | 11/2003 | Summers et al. | |
| 2003/0217365 A1 | 11/2003 | Caputo | |
| 2004/0090996 A1 | 5/2004 | Wu et al. | |
| 2004/0163129 A1 | 8/2004 | Chapman et al. | |
| 2004/0181800 A1 | 9/2004 | Rakib et al. | |
| 2005/0039212 A1 | 2/2005 | Baran et al. | |
| 2005/0102702 A1 * | 5/2005 | Candelore et al. | 725/100 |
| 2005/0114900 A1 | 5/2005 | Ladd | |
| 2005/0198686 A1 | 9/2005 | Krause et al. | |
| 2005/0289618 A1 | 12/2005 | Hardin | |
| 2006/0020984 A1 | 1/2006 | Ban et al. | |
| 2006/0036750 A1 | 2/2006 | Ladd | |
| 2006/0047957 A1 | 3/2006 | Helms | |
| 2006/0067362 A1 * | 3/2006 | Ramakrishnan | 370/468 |
| 2006/0093067 A1 | 5/2006 | Jalali et al. | |
| 2006/0130107 A1 | 6/2006 | Gonder et al. | |
| 2006/0130113 A1 * | 6/2006 | Carlucci et al. | 725/118 |
| 2006/0171423 A1 * | 8/2006 | Helms et al. | 370/535 |
| 2006/0209709 A1 * | 9/2006 | Kovacevic | 370/252 |
| 2006/0248553 A1 | 11/2006 | Mikkelson et al. | |
| 2007/0022459 A1 | 1/2007 | Gaebel | |
| 2007/0076728 A1 | 4/2007 | Rieger | |
| 2007/0094691 A1 | 4/2007 | Gazdzinski | |
| 2007/0217436 A1 * | 9/2007 | Markley et al. | 370/401 |
| 2007/0241176 A1 | 10/2007 | Epstein et al. | |
| 2007/0250880 A1 | 10/2007 | Hainline | |
| 2008/0022012 A1 | 1/2008 | Wang | |
| 2008/0066112 A1 | 3/2008 | Bailey | |
| 2008/0075163 A1 * | 3/2008 | Brydon et al. | 375/240.02 |
| 2008/0098212 A1 | 4/2008 | Helms et al. | |
| 2008/0134156 A1 | 6/2008 | Osminer | |
| 2008/0134165 A1 | 6/2008 | Anderson | |
| 2008/0155059 A1 | 6/2008 | Hardin et al. | |
| 2008/0235746 A1 * | 9/2008 | Peters et al. | 725/111 |
| 2010/0269146 A1 * | 10/2010 | Britt | 725/110 |

* cited by examiner

APPARATUS AND METHODS FOR UTILIZING STATISTICAL MULTIPLEXING TO ENSURE QUALITY OF SERVICE IN A NETWORK

RELATED APPLICATIONS

This application is related to co-owned and co-pending U.S. patent application Ser. No. 11/048,334 entitled "APPARATUS AND METHODS FOR MULTI-STAGE MULTIPLEXING IN A NETWORK" filed Feb. 1, 2005, incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to the fields of statistical multiplexing and distribution of content such as e.g., digital video. In one exemplary aspect, the invention relates to improving the performance of a digital cable network by utilizing information gained via the demultiplexing process to enforce and maintain a quality of service policy.

2. Description of Related Technology

So-called "Quality of Service" or QoS refers generally to resource reservation and allocation control mechanisms. For example, QoS when implemented can provide different priority to different data flows, or guarantee a certain level of performance to a data flow.

The goal of QoS is to improve the user experience and a network's ability to deliver predictable results for sensitive applications such as audio, video, and voice applications. Elements of network performance within the scope of QoS often include bandwidth (throughput), latency (delay), and error rate. There are generally two broad classes of QoS: data reliability and temporal reliability. Each makes different demands on network technologies.

QoS guarantees become increasingly crucial when network capacity is limited, since inter alia there is increased risk of degraded service or content when the network capacity is approached. An everyday analogy might be a person's morning commute to work; when the network (streets and highways) approach their capacity, there is increased risk that an accident, auto breakdown, inclement weather, or just the delays associated with starting and stopping large volumes of cars will very significantly impact that person's arrival time. Conversely, when the highways and roads are lightly used, the risk of such significant delays are minimal. Commuter lanes (i.e., those specifically reserved for carpools, etc.) can be thought of as a QoS guarantee of sorts; those commuters utilizing these lanes will have effectively unimpeded travel and access, thereby all but guaranteeing a much more timely arrival at work.

QoS utilization and allocation of resources have long been implemented and described in the prior art for various other types of networks including, inter alia, packet switched networks. For example, U.S. Pat. No. 5,488,609 to Hluchyj, et al. issued Jan. 30, 1996 and entitled "DYNAMIC RATE ADJUSTMENT FOR OVERLOAD CONTROL IN COMMUNICATION NETWORKS" is exemplary of one such implementation. It discloses a device (500) and method (300) which provide for management of resource allocation on selected links in a connection-oriented communication network such that existing connections may share the burden of freeing up resources for accommodating new connections. The rate of a connection is dynamically adjusted, on a connection-by-connection basis, using information on the status of each link broadcast throughout the network. Links are marked based on control information in the link state, and the in-call rate adjustment is based on negotiable Quality of Service (QoS) parameters.

U.S. Pat. No. 7,012,891 to Chandran, et al. issued Mar. 14, 2006 and entitled "METHOD AND APPARATUS FOR APPLYING QUALITY OF SERVICE TO MULTICAST STREAMS TRANSMITTED IN A CABLE NETWORK" discloses a method and apparatus for providing quality of service parameters for transmissions of multicast streams on a cable network is provided. A cable network headend connects an external network to a hybrid fiber coax or cable network. The cable network headend maintains a table of cable modems with entries associating each cable modem with one or more quality of service parameters. Virtual cable modem entries are created for multicast streams when indications of quality of service for multicast streams are received by the cable network headend. Multicast packets arriving at the cable network headend are processed using the stored quality of service parameters for the corresponding multicast stream. The multicast packets may then be transmitted, queued, or dropped depending on the specified parameters and traffic shaping or policing algorithms.

QoS utilization and allocation of resources has also been implemented and described in telecommunications networks. For example, U.S. Pat. No. 5,825,779 to Putnins, et al. issued Oct. 20, 1998 entitled "PBX NETWORKING WITH QUALITY OF SERVICE CONTROL" discloses a networking node for interconnecting a local telephone switch such as a private branch exchange (PBX) with other such switches through other nodes, with respective internodal multichannel digital transmission links interconnecting the various nodes, provides service for both data and voice messages. The networking node provides at least two levels (one of which may be zero) of compression for voice messages and permits one of those levels to be preselected for all voice messages from the switch with which the node is associated to a predetermined one or more of the other nodes in the network. A look-up table is stored in memory within the node to control the assignment of particular levels of compression to particular destinations.

U.S. Pat. No. 5,581,544 to Hamada, et al. issued Dec. 3, 1996 and entitled "METHOD AND APPARATUS FOR EVALUATING IN ATM MULTIPLEXING APPARATUS IN WHICH PRIORITY CONTROL IS PERFORMED AND FOR CONTROLLING CALL ADMISSIONS AND OPTIMIZING PRIORITY CONTROL ON THE BASIS OF THE EVALUATION" discloses a probability transition matrix $S_t$ that expresses a multiplexing process which includes nested threshold priority control and classified priority control. A state equation using the matrix $S_t$ is solved by substituting therein upper and lower bounds of a probability distribution of a cell arrival count at in an average time series, to calculate a probability distribution of a cell length in a buffer. From the thus calculated cell length probability distribution, the QoS is evaluated on a priority class basis. Based on the QoS evaluation, optimization of call admission control and priority control is accomplished.

QoS utilization and allocation of resources has also been implemented and described in broadband networks. For example, U.S. Pat. No. 7,283,803 to Karaoguz, et al. issued Oct. 16, 2007 and entitled "LOCATION-AWARE APPLICATION BASED QUALITY OF SERVICE (QOS) VIA A BROADBAND ACCESS GATEWAY" discloses a system and method supporting access to multimedia information based upon user-defined quality of service criteria is disclosed. A broadband access gateway may coordinate network behavior during the transition of an access device among communication pathways having different available capacities. Adjustments in bitrates and levels of compression may be made based upon the user-defined quality of service criteria. The user may be notified when network conditions disallow support for the desired quality of service, and may choose to override selected criteria. The user-defined quality of service criteria may be stored within the gateway and associated with a user, or may be located in the access device and accessible to the gateway.

U.S. Pat. No. 6,856,786 to Belostotsky, et al. issued Feb. 15, 2005 and entitled "QUALITY OF SERVICE SCHEDULING SCHEME FOR A BROADBAND WIRELESS ACCESS SYSTEM" discloses a dynamic quality of service maintenance system for use with a broadband wireless or cable access system comprising a plurality of wireless modems and a wireless hub, the dynamic quality of service maintenance system maintaining adequate bandwidth for the wireless modems based upon the services provided to the wireless modems by the broadband wireless access system.

U.S. Pat. No. 5,944,795 to Civanlar issued Aug. 31, 1999 and entitled "CLIENT-SERVER ARCHITECTURE USING INTERNET AND GUARANTEED QUALITY OF SERVICE NETWORKS FOR ACCESSING DISTRIBUTED MEDIA SOURCES" discloses an improved client-server architecture of the present invention utilizes the advantages of known QoS networks to provide guaranteed quality of service, security, and a charge mechanism for handling requests initiated over a packet network, such as the Internet, for access to distributed media sources. Such media sources may be independent of the QoS network provider and may be located by browsing the Internet. A method of operating a client-server network enables the system level merger of the Internet and a guaranteed QoS network, such as the public switched telephone network, in order to provide the users with a complete information superhighway today. It will appear to the average user that the Internet and the QoS network are fused together. Thus, when a user, connected to the Internet, selects an application that requires functionalities offered by the telephone network, such as guaranteed QoS delivery of media information or customized billing, the Internet-resident application will communicate information to a server, which will in turn initiate a session over the QoS network for delivery of the required information to the client using client information transmitted from the client (or from the application) to the server over the established Internet session. The client information may include a client account number, login and password, and/or phone number to enable the server to establish the switched network connection to the client. Accordingly, media sources which are separate and independent from the QoS network provider may be accessed using a secure, guaranteed QoS network in a manner providing for ease of identification and billing.

Despite the foregoing plethora of different approaches to QoS, there exists no effective QoS implementation in content-based (e.g., cable, fiber optic, or satellite) networks that enforces QoS policy within the subscriber's premises and which allows for efficient bandwidth utilization. Specifically, in current cable or satellite networks, a subscriber's consumer premises equipment (CPE) has no way to characterize the QoS properties of a variable bitrate (VBR) program stream, nor to ensure a QoS will be maintained when a user selects a particular program stream. Static policies are typically employed in such cases; for instance, the instantaneous bitrate of an HD (high definition) program stream might average 5-8 Mbps, yet have only very occasional peaks up to say 15 Mbps. Under a static policy, such peaks would need to be accounted for (lest the content be "clipped" and accordingly potentially degraded in quality that is perceivable by a viewer), and hence a static bandwidth allocation of 15 Mbps would be applied for the entire duration of that program stream. Hence, there is substantial bandwidth utilization inefficiency in existing static-policy based systems where QoS is required.

Statistical Multiplexing—

In traditional digital television networks, digital programming is collected at a central location, assembled in multiple program transport streams and transported to other intermediate locations in the network for further downstream transportation to the consumer's premises equipment (CPE). In recent years, statistical multiplexing techniques have been employed in an increasing number of central locations (e.g., cable headends) to efficiently create the centrally aggregated program multiplexes. As is well known, statistical multiplexing (colloquially referred to as "stat mux") is a technique used to efficiently pack multiple programs within a transport stream. This technique relies on the principle that the instantaneous bandwidth required to transmit a given program fluctuates over time, typically based on the ease of compression of the video content. This makes bandwidth-efficient transmission of multiple programs possible as a multiplex by sharing the allocated bitrate. Because the bitrate peaks of separate program streams do not occur simultaneously, a group of programmers can share an allocated bitrate that is smaller than the sum of the bitrate peaks of the program streams carried. Furthermore, the bitrate contribution each individual program stream is typically controlled (commonly referred to as rate shaped) to provide both a safety factor and even greater efficiencies. Conventional approaches to statistical multiplexing have recognized that the greater the number of programs in a multiplex (i.e., "pool size"), the better the chances of using bandwidth efficiently.

A variety of approaches to statistical multiplexing are in evidence under the prior art. For example, U.S. Pat. No. 5,708,664 to Budge, et al. issued Jan. 13, 1998 entitled "STATISTICAL MULTIPLEXING" discloses a transmitter for transmitting a plurality of digital signals through a plurality of channels, the channels having a predetermined total allocated bitrate. The transmitter includes a plurality of encoders each associated with one channel, a multiplexer for receiving the encoded digital signals and for transmitting the encoded signals as a stream of data, and operable for adjusting the distribution of the bitrate allocation between and among the encoded signals, and a processing device for providing an indication of a target quality and an actual quality for each channel and for causing the multiplexer to repeatedly adjust the distribution of the bitrate allocation in response to differences between the indicated actual quality and the indicated target quality for each channel so as to equalize differences between the actual and target quality across at least some of the channels. By grouping encoders together in "statistical multiplex groups", and making real time decisions about the bitrate requirements for those encoders, bitrate can be allocated to maximize picture quality for the group. For a variety of different picture sources in a statistical multiplex group, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and subjectively improve it.

U.S. Pat. No. 6,285,716 to Knee, et al. issued Sep. 4, 2001 entitled "VIDEO COMPRESSION" discloses a method to manipulate an MPEG-2 or other compressed video stream as separate information bus and coefficient streams. The information bus stream contains motion vector information but also information derived from a previous decoding operation for use in a subsequent coding operation. Processing in the coefficient domain enables bitrate conversion without decoding to the pixel level and also ostensibly simplifies the combination of MPEG layers.

U.S. Pat. No. 6,577,682 to Brightwell, et al. issued Jun. 10, 2003 entitled "VIDEO PROCESSING SYSTEM ALSO COMPRESSING CODING DECISION DATA" discloses a method in which an MPEG2 decoded video signal is accompanied by a representation of the coding decisions to aid downstream re-encoding. The representation is MPEG compliant bit modified as an attempt to reduce the number of bits.

U.S. Pat. No. 6,792,045 to Matsumura, et al. issued Sep. 14, 2004 entitled "IMAGE SIGNAL TRANSCODER CAPABLE OF BIT STREAM TRANSFORMATION SUPPRESSING DETERIORATION OF PICTURE QUALITY" discloses An MPEG2 decoder portion decodes an input bit stream and outputs a digital decoded image while extracting coding information and supplying the same to a control portion. An MPEG2 encoder portion re-encodes the digital decoded image output from the MPEG2 decoder portion. Coding information supplied from the control portion is reflected on a coding parameter in re-encoding. Transcoding between the MPEG2 standard and the DV standard can also be executed by arranging a decoder or an encoder corresponding to the DV standard in place of either the MPEG2 decoder portion or the MPEG2 encoder portion.

U.S. Pat. No. 6,795,506 to Zhang, et al. issued Sep. 21, 2004 entitled "METHODS AND APPARATUS FOR EFFICIENT SCHEDULING AND MULTIPLEXING" discloses techniques and mechanisms for scheduling and multiplexing compressed bitstreams. A compressed bitstream includes bitrate information describing the bitrate of video data. The bitrate information is used to ostensibly improve the scheduling and multiplexing efficiency of compressed bitstreams. Compressed video data can be transmitted over communication channels at bitrates that comply with available channel bandwidth.

United States Patent Publication 20010055336 to Krause, et al. published Dec. 27, 2001 and entitled "COMPRESSED-VIDEO RE-ENCODER SYSTEM FOR MODIFYING THE COMPRESSION RATIO OF DIGITALLY ENCODED VIDEO PROGRAMS" discloses a compressed video decoder/encoder (re-encoder) system for varying the compression ratio of a compressed video program. The composite re-encoder system implements tightly coupled elements for decoding and encoding compressed video data implementing techniques of header forwarding and utilizing an architecture in which a shared motion compensator supports both decoding and encoding operations simultaneously. The re-encoder system may be introduced in a statistical multiplexer for generating a compressed video data stream multiplex suitable for use in cable distribution and other video distribution systems.

United States Patent Publication No. 20020085584 to Itawaki, et al. published Jul. 4, 2002 entitled "STATISTICAL MULTIPLEX SYSTEM, STATISTICAL MULTIPLEX CONTROLLER AND METHOD OF STATISTICAL MULTIPLEX" discloses a statistical multiplex system, a statistical multiplex controller and a method of statistical multiplex, which can assign bitrates to program data and auxiliary data for purposes of image quality. A statistical multiplex system is provided with: a plurality of image encoders for encoding a plurality of program data; an information encoder for encoding the auxiliary data; a multiplexing apparatus for multiplexing output thereof, and a statistical multiplex controller for controlling each of the image encoders and the information encoder. The statistical multiplex controller is made to set the bitrate to be assigned to the information encoder first, and to assign the remaining bitrates to each of the image encoders.

Based on the foregoing, there exists a salient need in a digital content-based network for methods and apparatus that provide the ability to obtain and utilize QoS data for the variable bit program streams in order to, inter alia, implement and enforce QoS policy within the subscriber's premises environment (e.g., home network), while also allowing for efficient bandwidth utilization within the network so as to support delivery of a large number and density of digital content services to a single CPE. Ideally, such methods and apparatus would be readily practiced with existing infrastructure and network protocols, thereby making its implementation within extant content delivery networks (and associated CPE currently in use with subscribers) simple and very low cost.

SUMMARY OF THE INVENTION

The present invention addresses the foregoing needs by inter alia providing, in various embodiments, methods and apparatus for maintaining QoS information in a statistically multiplexed programs stream and subsequently using that information to enforce an associated QoS policy.

In a first aspect of the invention, a multiplexing apparatus adapted for the transmission of a plurality of content elements over a cable network is disclosed. In one embodiment, the apparatus comprises a multiplexing element, the multiplexing element adapted to receive the plurality of content elements from one or more content sources, and create at least one output multiplex based thereon; and a process in communication with the multiplexing element, the process being adapted to: evaluate at least one aspect of at least one of the plurality of content elements; generate data based at least in part on the evaluation. The multiplexing element is further adapted to incorporate the generated data into the at least one output multiplex.

In one variant the apparatus is located at the headend entity, and the at least one aspect comprises bandwidth information associated with the content elements.

In another variant, the at least one aspect comprises transport information associated with the content elements. Alternatively, the at least one aspect comprises picture or video quality information associated with the content elements.

In a further variant, the process comprises a computerized software process located substantially within the multiplexing apparatus. Alternatively, the process is located remote to the multiplexing apparatus, and the communication comprises a direct hardwired data interface.

As another alternative, the communication comprises an interface operative to use a packetized protocol, and/or a wireless or optical fiber interface.

In still another variant, the multiplexing element is further adapted to incorporate the generated data into the at least one output multiplex in the form of metadata. At least a portion of the metadata may utilize a proprietary syntax.

In yet a further variant, the multiplexing element and the process collectively comprise an integrated circuit having software adapted to run thereon.

In another variant, the generated data is associated with a private program identifier (PID) associated with a multiplexed transport stream (MPTS).

In a second aspect of the invention, consumer premises equipment (CPE) is disclosed. In one embodiment, the CPE comprises: a tuner, the tuner adapted to receive a multiplex, the multiplex comprising a plurality of content elements and descriptive data relating to at least one aspect of at least one content element; a demultiplexer, the demultiplexer further comprising a program ID (PID) filter, the PID filter adapted to locate and retrieve the data; and a processor element, the processor element adapted to utilize the data to implement at least one quality of service (QoS) policy for the content element.

In one variant, the tuner comprises a wideband tuner, the wideband tuner adapted to receive a plurality of different multiplexed transports distributed across multiple RF channels.

In another variant, the data relating to at least one aspect comprises bandwidth requirement information of the content element, transport information of a multiplexed transport stream carrying the content element, or picture quality or resolution data for the at least one content element.

In yet another variant, the processor element comprises an integrated circuit having a computer program capable of running thereon.

In a further variant, the CPE further comprises a data interface to a personal media device (PMD), the PMD being adapted to render the content according to the at least one QoS policy.

In still another variant, the at least one QoS policy comprises a UPnP-compliant QoS policy.

In another embodiment, the CPE comprises: a tuner adapted to receive a multiplexed transport; a demultiplexer element, the demultiplexer adapted to: demultiplex the multiplexed transport to derive a plurality of program streams; affix a time stamp to at least a portion of the program streams; a process, the process adapted to: map the program streams; utilize the time stamp to evaluate at least one aspect of the program streams; and generate data based at least in part on the evaluation; and a processor, the processor adapted to utilize the data to configure one or more parameters to establish at least one quality of service policy for at least one of the program streams.

In one variant, the tuner comprises a wideband tuner, the wideband tuner adapted to receive a plurality of different transports distributed across multiple RF channels.

In a third aspect of the invention, a content distribution system adapted for the transmission of a plurality of programs over a network is disclosed. In one embodiment, the network comprises a cable network, and the system comprises: at least one content source, the content source adapted to provide a plurality of content elements; a statistical multiplexing apparatus, the statistical multiplexing apparatus adapted to: receive the plurality of content elements; evaluate at least one aspect of the plurality of content elements; generate data relating to the evaluated at least one aspect of the plurality of content elements; create at least one output multiplex based on the plurality of content elements and the data; and a consumer premises device. The premises device is adapted to: receive the at least one output multiplex; demultiplex the output multiplex into individual content elements; retrieve and utilize the data to enforce at least one quality of service (QoS) policy for at least one of the individual content elements.

In one variant, the statistical multiplexing apparatus comprises a plurality of statistical multiplexing apparatus associated with a respective plurality of network nodes. At least one of the plurality of statistical multiplexing apparatus is associated with e.g., a cable headend, and at least one of the plurality of apparatus is associated with a cable distribution hub downstream of the headend.

In another variant, the statistical multiplexing apparatus comprises a wideband multiplex apparatus, the wideband apparatus adapted to multiplex a transport stream onto two or more carriers. The wideband apparatus comprises for example: a first process adapted to selectively extract content data packets associated with a plurality of different programs from a plurality of N input queues; and a second process adapted to selectively allocate the extracted content data packets to a plurality of M RF channels. The packets associated with at least one of the plurality of different programs are distributed across multiple ones of the M RF channels.

In a fourth aspect of the invention, a method of operating a content-based network is disclosed. In one embodiment, the method comprises: receiving a plurality of content elements from at least one content source; evaluating at least one aspect of the plurality of content elements; generating data based at least in part on the evaluation; generating at least one output multiplex based at least in part on the plurality of content elements and the data; providing the output multiplex to a consumer premises device; demultiplexing the output multiplex into individual content elements; and utilizing the data to configure a quality of service policy for at least one of the individual content elements.

In one variant, the act of generating at least one output multiplex comprises generating an output multiplex by a first entity and subsequently modifying the output multiplex by a second entity. The first entity comprises for example a headend statistical multiplexer, and the second entity comprises at least one hub within the network.

In another variant, the modification comprises incorporating the data into the output multiplex.

In a further variant, the act of evaluating at least one aspect of the plurality of content elements comprises evaluating the bandwidth requirements of at least one of the plurality of content elements.

In another embodiment, the method of operating a content-based network comprises: generating at least one output multiplex based at least in part on a plurality of content elements; providing the output multiplex to a consumer premises device; demultiplexing the output multiplex into a plurality of demultiplexed content elements; affixing time stamps to respective ones of packets within at least one of the demultiplexed content elements; utilizing the time stamps to evaluate at least one aspect of the demultiplexed content elements; generating data based at least in part on the evaluating; and utilizing the data to provide at least one quality of service policy for at least one of the demultiplexed content elements.

In one variant, the act of generating at least one output multiplex comprises generating an output multiplex by a first entity and subsequently modifying the output multiplex by a second entity. The first entity comprises e.g., a headend statistical multiplexer and the second entity comprises at least one hub within the network.

In another variant, the act of evaluating at least one aspect of the plurality of content elements comprises evaluating the bandwidth requirements of the plurality of content elements.

In a fifth aspect of the invention, a method of doing business within a content-based network is disclosed. In one embodiment, the method comprises: providing an output multiplex of program content having associated quality of service information; providing to a subscriber of the network apparatus for demultiplexing the program content and for selectively utilizing the quality of service information; and ensuring a quality of service for the subscriber based at least in part on the selective utilization of the quality of service information.

In one variant, the quality of service information comprises at least one of information selected from the group consisting of: (i) bandwidth requirement information; (ii) multiplex transport information; and (iii) picture quality or resolution information related to the program content.

In another variant, the ensuring a quality of service comprising implementing a QoS policy compliant with the UPnP standard. The demultiplexing apparatus comprises a settop box, and the QoS policy is enforced within a personal media device (PMD) in data communication with the settop box using a UPnP protocol.

In a sixth aspect of the invention, a method of operating a consumer premises equipment (CPE) is disclosed. In one embodiment, the method includes tuning a tuner to receive a multiplex, the multiplex having a plurality of content elements and descriptive data relating to at least one aspect of at least one content element, demultiplexing the multiplex via a demultiplexer comprising a program ID (PID) filter configured to locate and retrieve the descriptive data relating to the at least one aspect of the at least one content element, and utilizing the descriptive data relating to the at least one aspect of the at least one content element to implement at least one quality of service (QoS) policy for playback of the content element by the CPE.

In a seventh aspect of the invention, a consumer device for use in a content-based network is disclosed. In one embodiment, the consumer device includes a storage device, a network interface, and a data processor in data communication with the network interface and storage device. The data processor is configured to run at least one computer thereon. In one variant, the at least one computer program comprises a plurality of instructions configured to, when executed, receive via the network interface at least one output multiplex comprising at least in part a plurality of content elements, demultiplex the at least one output multiplex into a plurality of demultiplexed content elements, download, to the storage device, at least one application. The program is further configured to, in this variant, affix time stamps to respective ones of packets within at least one of the demultiplexed content elements, utilize the time stamps to evaluate at least one aspect of the demultiplexed content elements, generate data based at least in part on the evaluating, the data comprising at least quality of service (QoS) parameters for individual ones of the demultiplexed content elements, and utilize the data to configure the consumer device according to one or more parameters in order to provide the QoS policy for at least one of the demultiplexed content elements.

These and other aspects of the invention shall become apparent when considered in light of the disclosure provided below.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which.

DETAILED DESCRIPTION OF THE INVENTION

Figure 1:
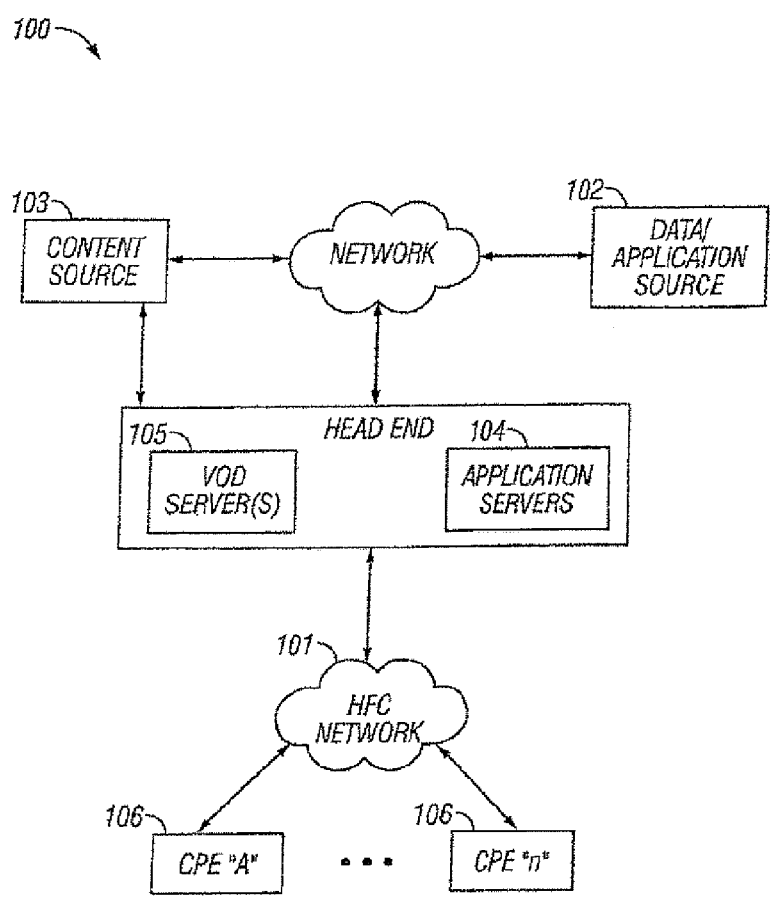
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "legacy" refers to any component, system, process, or method which is prior to the most current generation, revision, or modification of such component, system, process, or method.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "statistical" refers without limitation to any process, component or analytical framework based at least in part on one or more statistical, anecdotal or deterministic parameters. Such process, component or framework may be implemented for example using a posteriori data, via actual or effective a priori relationships or data, or otherwise.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the term "UPnP" and variations thereof refers without limitation to UPnP™ Forum's Standardized DCPs entitled "UPnP QoS Architecture: 1.0" dated Mar. 10, 2005; "UPnP QoS Architecture: 2" dated Oct. 16, 2006, and any related or subsequent versions thereof, each of the foregoing being incorporated herein by reference in its entirety.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, apparatus and methods for enhancing the efficiency and capability of multiplexed network systems such as cable television networks with respect to various types of content carried thereon.

As previously discussed, there is currently no effective and efficient solution or mechanism for providing for QoS within a home or other such premises environment consistent with network policies. In one embodiment, the present invention obtains useful descriptive information relating to the content (e.g., bitrate as a function of time) and creates a "traffic specification" or "tspec" for use in the premises environment. The statistical multiplexer in this embodiment signals the consumer premises equipment (e.g., settop box) regarding characteristics of the transmitted video stream and the descriptive parameters such as minimum/maximum/average bitrates, jitter/delay, or anything that would affect QoS (or that relates to the properties of the relevant transport generally). This information is used by the CPE to maintain and enforce a QoS policy within the premises content distribution environment. Such QoS policy may relate to either or both (i) temporal aspects of QoS (i.e., is the temporal relationship of the media or content preserved so that the user's experience is substantially unaffected), and (ii) the data reliability aspects of QoS (i.e., is the content data received substantially error-free and uncorrupted, which may or may not impact the aforementioned temporal relationships).

In another embodiment of the invention, an improved consumer premises device is provided which is adapted to receive a multiplexed program transport stream (MPTS) and subsequently demultiplex and time-stamp the resulting constituent single program streams. The time stamps are then utilized to generate QoS data that is utilized to enforce and maintain the aforementioned premises QoS policy.

The foregoing embodiments are each advantageously implemented within the existing network infrastructure and legacy CPE without significant modification, thereby making these features very low cost to the MSO, while providing the benefits of increased subscriber satisfaction (through enhanced QoS performance) and enhanced network bandwidth utilization.

Methods for the utilization of the above-mentioned apparatus, and associated business methods, are also disclosed.

DESCRIPTION OF EXEMPLARY EMBODIMENTS

Exemplary embodiments of the apparatus and methods of the present invention are now described in detail. While these exemplary embodiments are described in the context of the hybrid fiber coax (HFC) cable architecture having a multiple systems operator (MSO), digital networking capability, and plurality of client devices/CPE, the general principles and advantages of the invention may be extended to other types of networks and architectures where the maintenance of QoS policy is desired. Hence, the following description is merely exemplary in nature.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Lastly, while described primarily in the context of a downstream "broadcast" paradigm, it will be understood that the various aspects of the present invention are equally applicable regardless of whether a given program is intended for broadcast or supplied via an on-demand (OD) or other such "user pull" service.

Many other permutations of the foregoing system components and communication methods may also be used consistent with the present invention, as will be recognized by those of ordinary skill in the field.

Bearer Network Architecture—

FIG. 1 illustrates a typical content-based network configuration within which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VOD server 105 comprises a computer system where on-demand (OD) content can be received from one or more of the aforementioned data sources 102 and enters the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
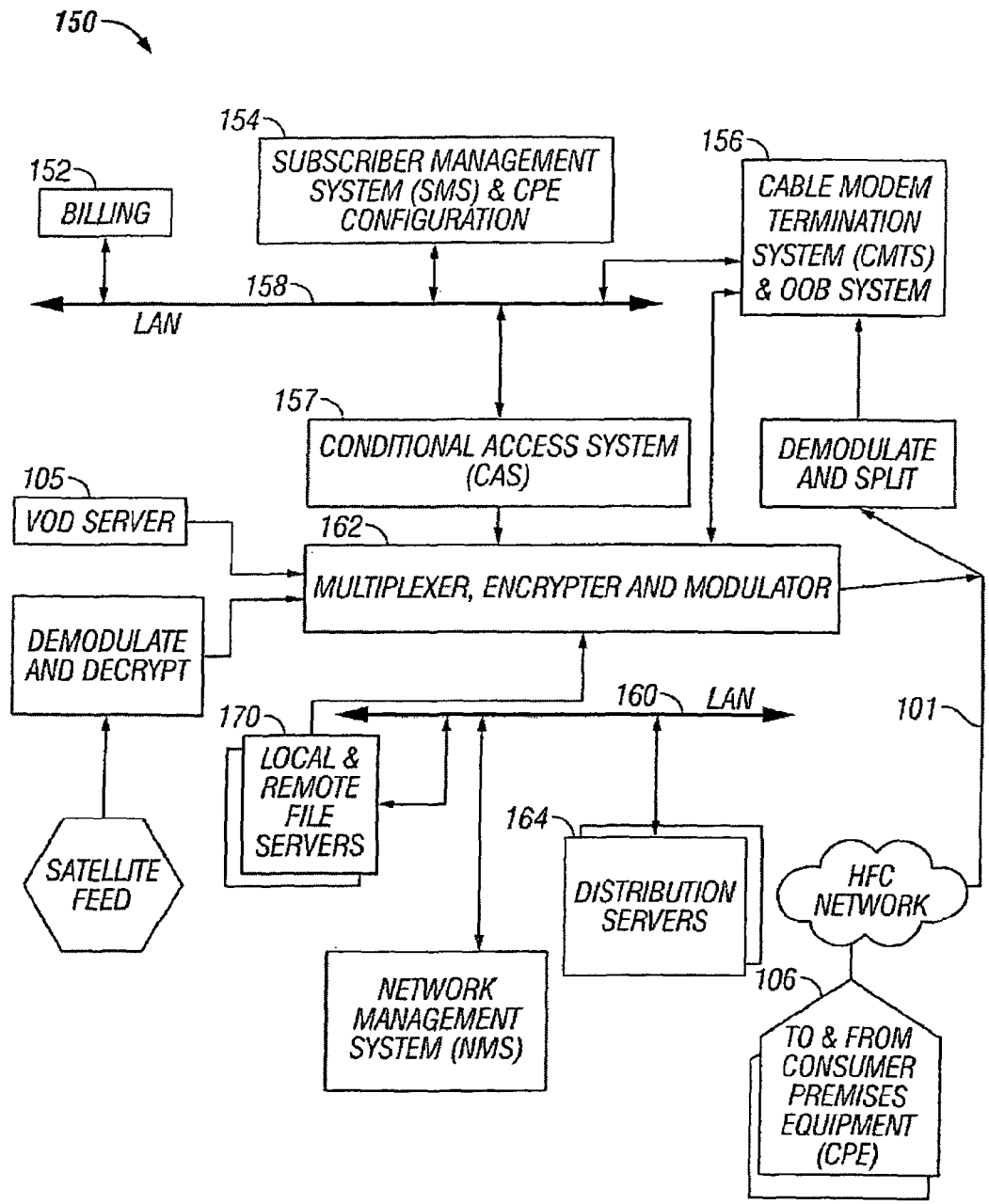
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
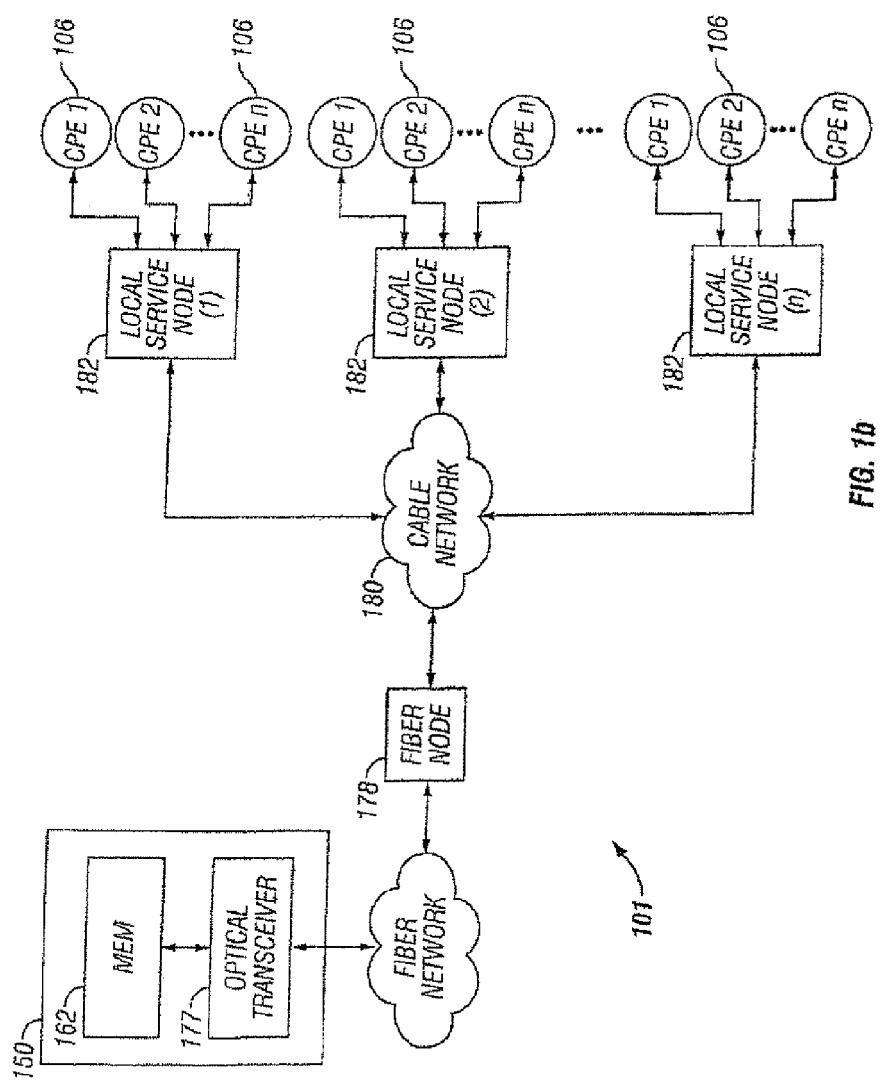
FIG. 1b is a functional block diagram illustrating one exemplary local service node configuration useful with the present invention.

The architecture 150 of FIG. 1a further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, and sent to neighborhood hubs (FIG. 1b) via a variety of interposed network components.

Figure 1C:
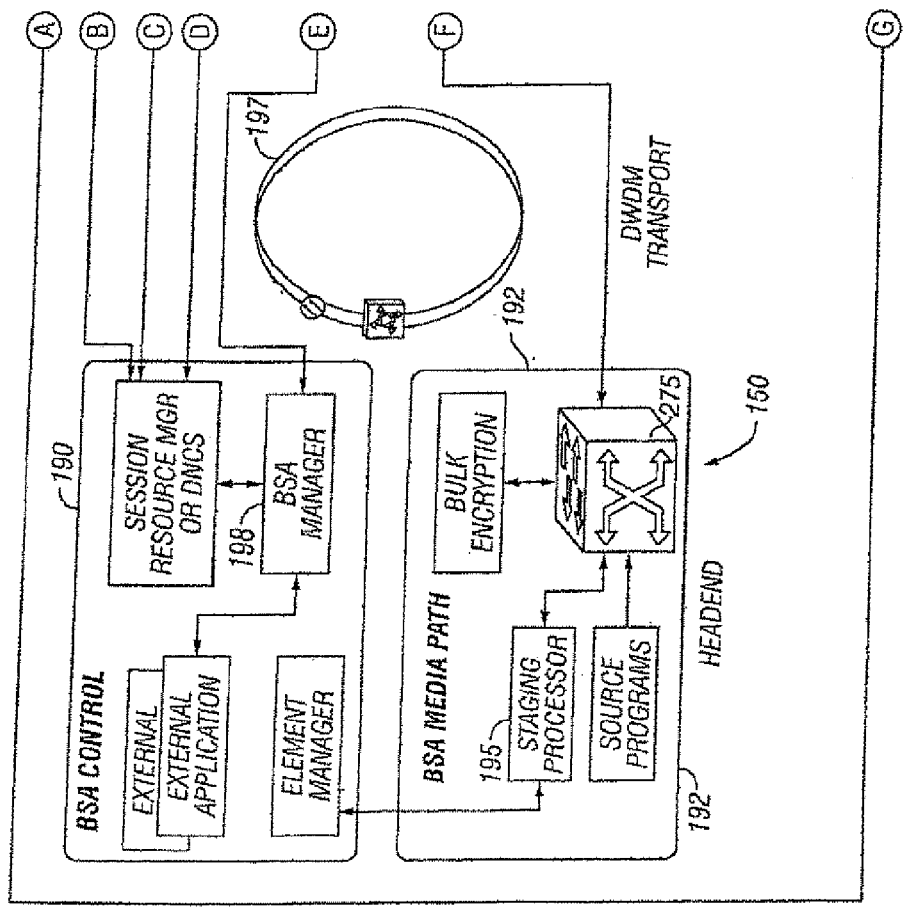
FIG. 1c is a functional block diagram illustrating one exemplary broadcast switched architecture (BSA) network useful with the present invention.
Figure 1C:
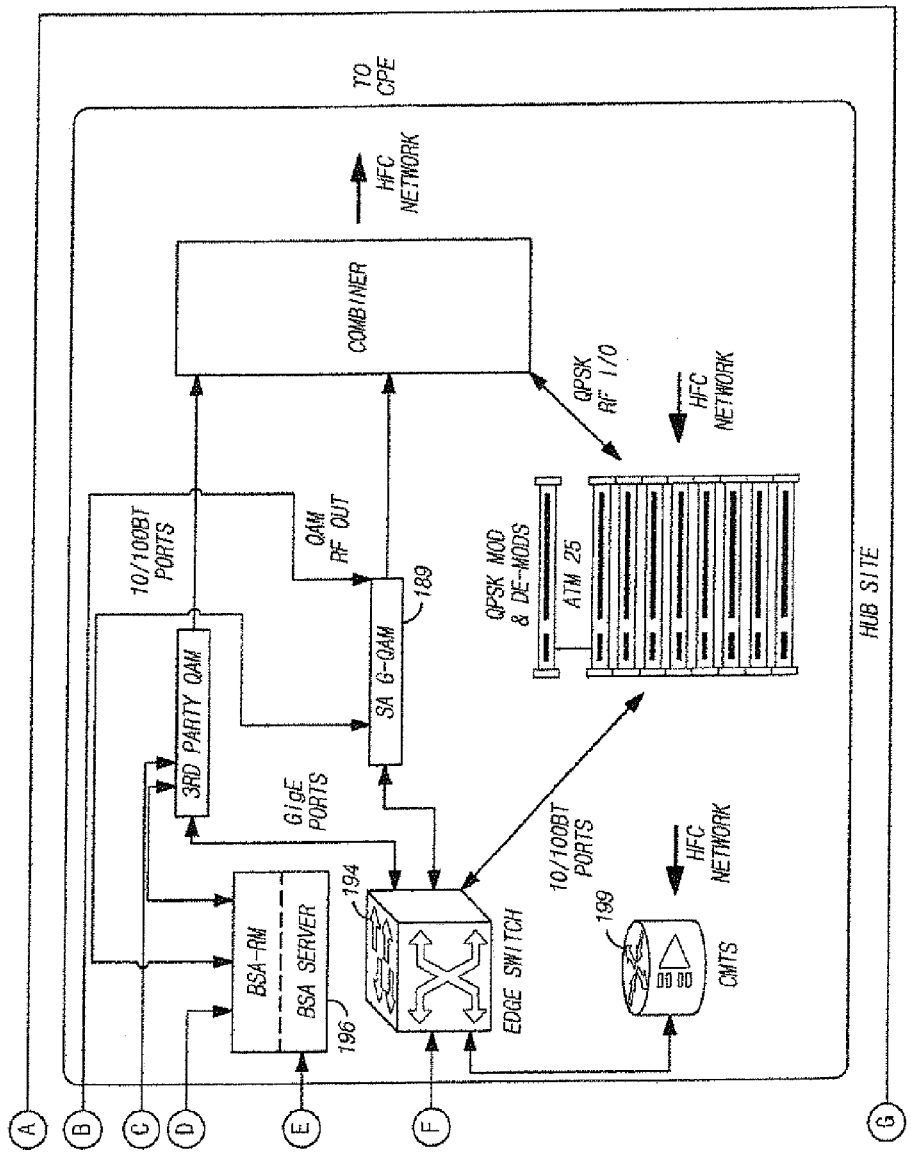

It will also be recognized, however, that the multiplexing operation(s) of the present invention need not necessarily occur at the head-end 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" previously incorporated herein, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates exemplary "switched" network architecture also useful with the apparatus and features of the present invention. While a so-called "broadcast switched architecture" or BSA network is illustrated in this exemplary embodiment, it will be recognized that the present invention is in no way limited to such architectures and in fact can be used with many other types of content delivery paradigms.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE 106. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Multiplexer Apparatus—

Figure 2:
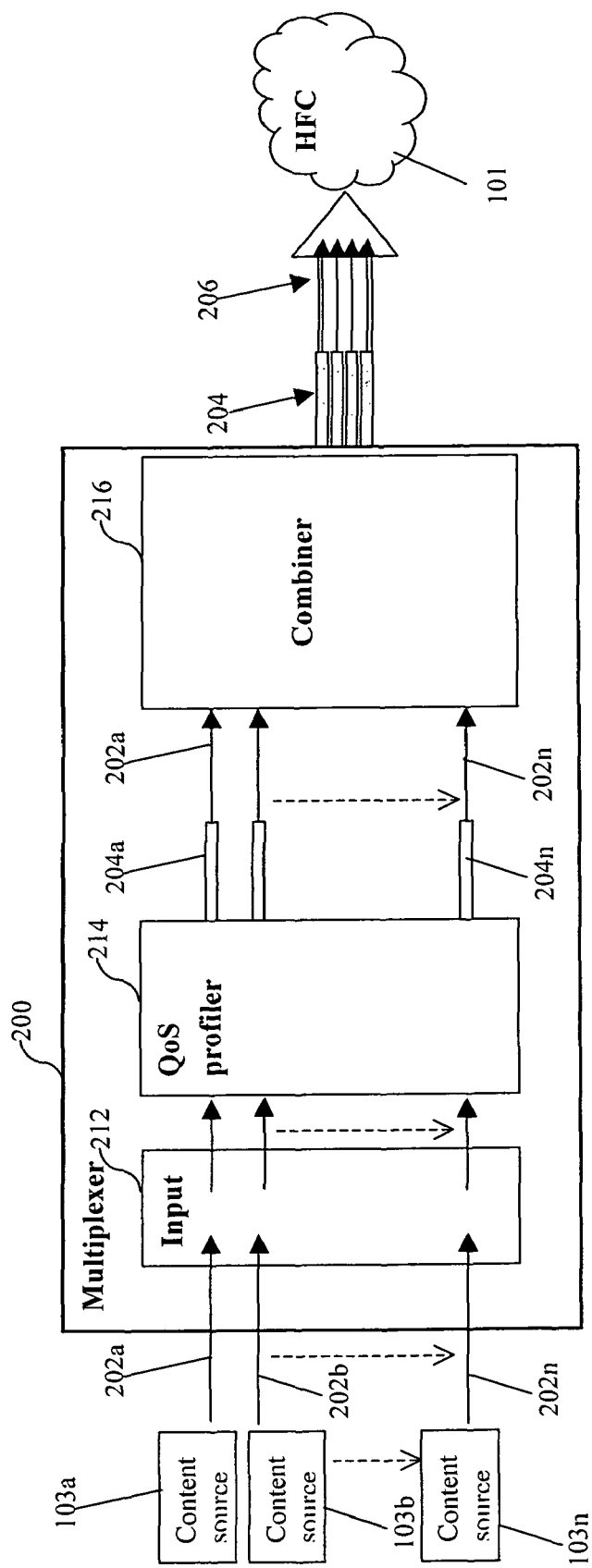
FIG. 2 is a functional block diagram of one exemplary configuration of a network system multiplexer adapted to insert QoS data according to the present invention.

FIG. 2 illustrates one exemplary embodiment of a multiplexer apparatus 200 according to the present invention. This illustrated device 200 differs from a prior art multiplexer 162 (for example such as that described above with respect to FIG. 1a) in that the multiplexer 200 of FIG. 2 is adapted to insert "QoS" data 204 for use by a CPE 106 to implement a specific QoS policy. As will be described in greater detail subsequently herein, this QoS data may comprise any different number of different types of information (including that relating to the relevant transports or MPTSs), and may take any number of different forms. In the illustrated embodiment, the multiplexer 200 is adapted to incorporate QoS data 204 regarding constituent program streams prior to multiplexing; however, it is appreciated that in other embodiments the addition of the QoS data 204 may occur simultaneously with or even after multiplexing has occurred.

The multiplexer 200 of the illustrated embodiment receives several constituent program streams 202a, 202b . . . 202n from one or more content sources 103a, 103b . . . 103n. These streams 202 will typically comprise a single program or content stream; however, it will also be recognized that these streams may also be "composite" in nature themselves, such as e.g., wherein the program stream comprises program data and other associated data (e.g., metadata), or alternatively where the content stream 202 itself comprises a multiplex of two or more individual streams.

It is of note that the multiplexer 200 of the present invention may be located either at the headend 150 or, in a switched network, at a BSA node or hub of the type discussed above. The program streams 202 are received at the multiplexer input element 222. After receiving the content source program streams 202, the multiplexer 200 sends them to the QoS profiler 224. The QoS profiler 224 evaluates various aspects of the program streams 202 received and derives QoS information 204. In one embodiment, the QoS profiler comprises a computer program running on the multiplexer 200 that analyzes the content streams in real time in order to characterize them with respect to their relevant QoS/transport parameters. It may be made part of (e.g., a module of) the extant statistical multiplexing algorithm if desired.

This profiler process may also be aggregated with other content processing algorithms that may be applied to the content streams including for example encoding/decoding, transcoding or transrating, encryption/decryption, filtration or compression, quantization, etc., whether within the multiplexer 200, or at one or more other locations. This approach may provide significant processing economies and reduction of latency, since the processing of content data by the QoS profiler is somewhat akin to other processing such a transrating. For example, well known technology such as that offered by BigBand Networks or Motorola, utilize encoder algorithms that determine on frame-by-frame basis how to encode data within a media stream; depending on complexity of frame, the encoder and the statistical multiplexing process cooperate to encode the frame(s) according to the appropriate scheme. In the current invention, such algorithms may be modified so as to generate the requisite bandwidth/bitrate profile data and capture it for use in subsequent operations as described elsewhere herein, thereby obviating a wholly separate process for the profiling functionality.

The stream-specific QoS data 204a, 204b . . . 204n generated by the QoS profiler 224 is attached by the profiler to the program streams 202a, 202b . . . 202n, respectively. It will be appreciated, however, that while the illustrated embodiment shows the QoS data associated with a stream being inserted into or attached to that same stream, other approaches may be used. For example, it may be desirable in certain circumstances to aggregate the QoS data for all or a subset of the multiple streams 202 into a single "package" that is then inserted into one of the streams, or alternatively transported downstream on another transport or even via another communication channel.

Next, the combiner 226 creates a multiplexed multi-program transport stream (MPTS) 206 using statistical multiplexing algorithms of the types well known in the digital signal processing arts. The MPTS 206 comprises the various content source program streams 202 received along with each stream's attached QoS data 204. The generation of an MPTS from a plurality of program streams by statistical multiplexing is well known in the arts and will not be further described herein.

In one embodiment of the invention, the QoS information 204 is added to the MPTS 206 by placing it on a private section of an assigned PID on the MPTS. In another embodiment, the QoS data is added by placing program-specific QoS data 204 on a private PID for each program. Yet other techniques may also be used consistent with the invention. After the MPTS 206 having associated QoS data 204 is created, it is sent (via the route described above with respect to FIGS. 1-1c; i.e., over the interposed portions of the HFC network 101) to one or more subscriber CPE 106.

In an alternate embodiment, the aforementioned QoS information 204 may be generated before any statistical multiplexing or other such processing is applied to the content or after statistical multiplexing or other processing is applied). In other words, in an alternate embodiment to that described above, the multiplexer 200 multiplexes the content source program streams 202 into an MPTS 206, then evaluates the content source program streams 202 to derive QoS data 204.

In another alternative (not shown), an entity separate from the multiplexer 200 is responsible for evaluating the content source program streams 202, deriving QoS data 204, and/or inserting the QoS data 204 into an MPTS 206. The separate entity may be inter alia, a second multiplexer, a headend entity, or a content source. For example, a content provider may generate the data before content ingestion into the MSO network. Alternatively, the MSO might employ a pre-processor (not shown) to evaluate and characterize the programs streams It is further noted that not all of the program streams within a given MPTS necessarily need be evaluated for QoS purposes. For example, it may be that one or more of the constituent streams exhibit very little variability in their actual bitrate (at least for certain periods of time) due to e.g., particular characteristics of the program or content. Accordingly, one variant of the invention identifies such streams to the multiplexer QoS profiler 224 which then masks these streams from profiling (at least during the aforementioned certain periods of time) and subsequent generation of QoS data. Alternatively, the profiler can generate "null" or other QoS data which will be interpreted by the downstream entity making use of the data (e.g., distribution/switching hub or CPE 106) as the relevant stream having a static bitrate profile. As yet another alternative, these streams can be identified before multiplexing/QoS data generation and just handled under the prior art "static" model previously discussed herein, at least during the relevant time periods, thereby relieving the multiplexer 200 from having to generate data for these streams.

These streams can also optionally be treated differently within the statistical multiplexing pool (e.g., excluded or otherwise compensated for in the statistical multiplexing algorithms, since their "statistics" are to some degree divergent with the other more highly variable content streams that are part of the pool).

CPE—

Figure 3A:
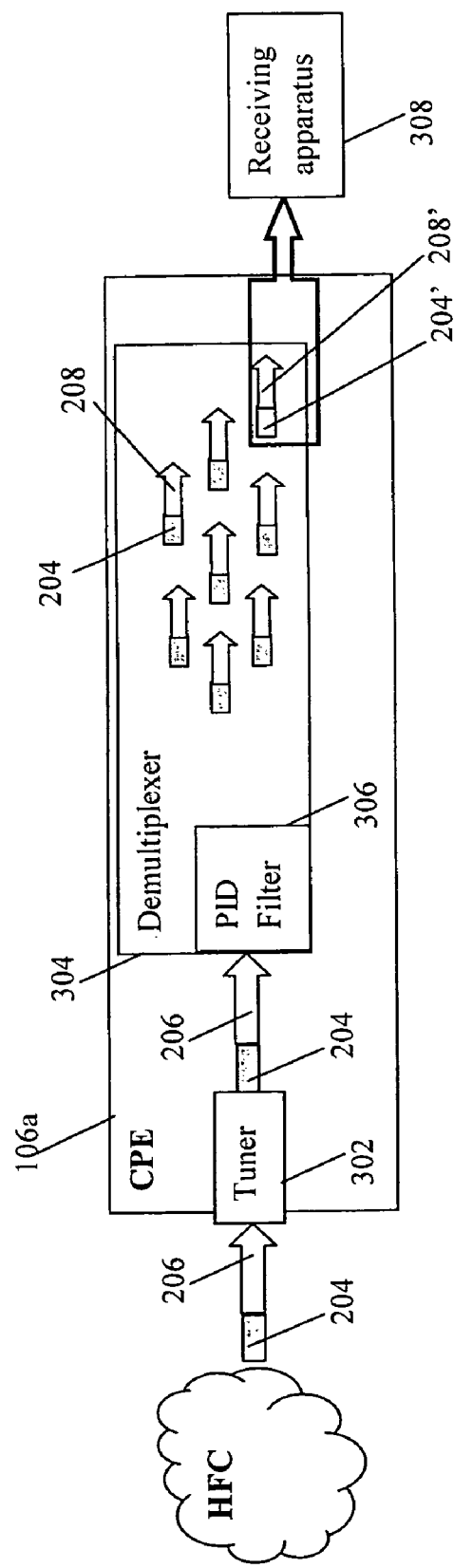
FIG. 3a is a functional block diagram of one exemplary embodiment of CPE adapted to utilize the QoS data attached to an MPTS to enforce a QoS policy according to the invention.
Figure 3B:
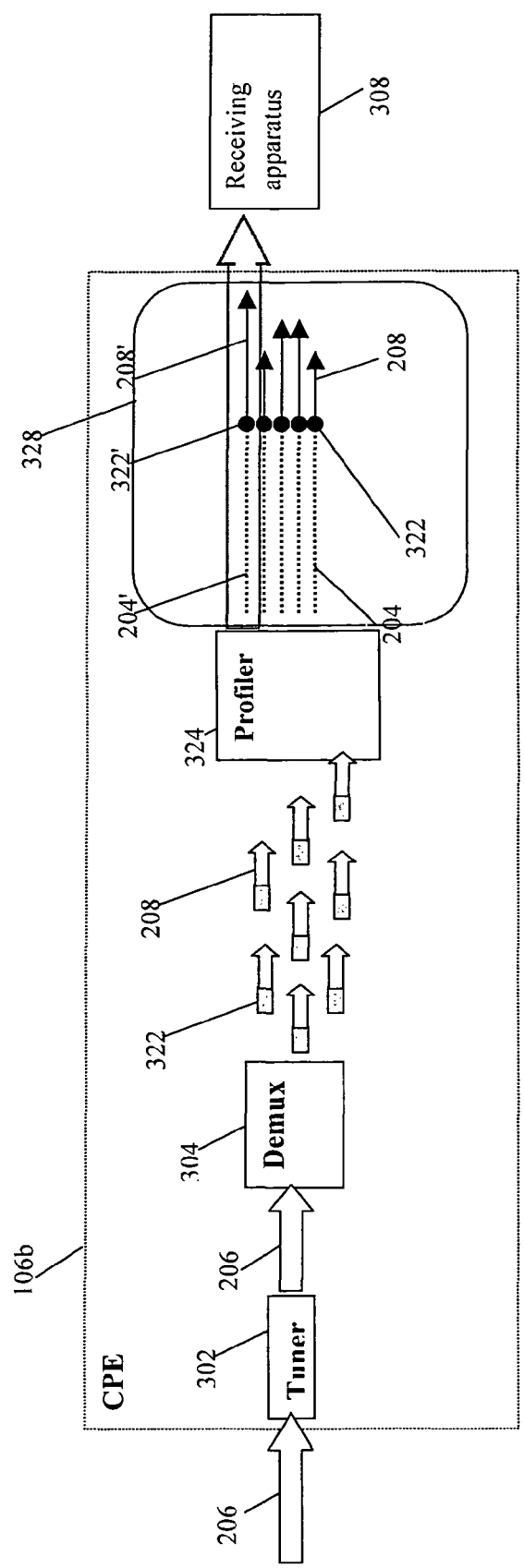
FIG. 3b is a functional block diagram of one exemplary embodiment of CPE adapted to derive and utilize QoS data to ensure a QoS policy according to the invention.

FIGS. 3a and 3b describe two exemplary embodiments of CPE 106 adapted for use in the present invention, 106a and 106b respectively. The CPE 106a of FIG. 3a is adapted to be used in conjunction with, inter alia, the multiplexer apparatus 200 of FIG. 2. It is noted however, that other apparatus (not shown) adapted to insert QoS data 204 into an MPTS 206 may also be used in conjunction with the CPE 300 of FIG. 3a.

The CPE 106b of FIG. 3b is intended to be used with prior art multiplexer 162 and other prior art headend devices, none of which are adapted to attach QoS data 204 to an MPTS 206.

Each of these CPE 106a, 106b embodiments is now discussed in greater detail.

Referring now to FIG. 3a, a CPE 106a adapted to receive MPTS 206 from a multiplexer 200 adapted to insert QoS data 204 thereto (such as that of FIG. 2 above) is illustrated. The CPE 106a utilizes the QoS data 204 to enforce one or more QoS policies in the subscriber premises of a cable network.

In the illustrated embodiment, the distributed MPTS 206 (including associated QoS information 204) is received by the CPE 106a via a front-end tuner 302. It will be appreciated that the tuner 302 may comprise multiple discrete tuners, or even a wideband tuner of the type discussed in further detail subsequently herein. The tuner 302 sends the MPTS 206 (including QoS information 204) to a demultiplexer 304 within the CPE 106a which includes a MPEG 2 Program Identifier (PID) filter 306. The demultiplexer 304 demultiplexes the MPTS 206 to individual or single program transport streams (SPTSs) 208. The PID filter 306 present on the demultiplexer 304 utilizes the QoS PID assigned by the QoS profiler of the multiplexer 200 to locate and retrieve the QoS information 204 about the individual constituent SPTSs 208. The demultiplexer 304 is adapted to associate the QoS information 204 to the appropriate SPTS 208. The overall result of this process is that the demultiplexer 304 of the CPE 106a generates several SPTSs 208 each having associated QoS information 204 from the MPTS 206 QoS information received by the tuner 302.

When a particular SPTS 208' is selected by a user, the CPE 106a will find that SPTS 208' and use the associated QoS data 204' to configure the receiving apparatus 308 for that particular video stream. Thus, when the particular SPTS 208' is outputted to a receiving apparatus 308, (having a decoder and/or display element), the apparatus 308 will be ready to enforce QoS for that stream 208'. Note that the CPE 106a may be adapted to perform the above function via a decryptor (not shown); or in one embodiment via a resource manager (not shown). The utilization of an exemplary resource manager is described in co-owned, co-pending U.S. patent application Ser. No. 12/070,560 entitled "MULTI-STREAM PREMISES APPARATUS AND METHODS FOR USE IN A CONTENT-BASED NETWORK" filed contemporaneously herewith (Feb. 18, 2008) and incorporated herein by reference in its entirety, although other configurations may be used with equal success consistent with the present invention.

Referring now to FIG. 3b, a CPE 106b adapted to receive MPTS 206 from a prior art multiplexer 162 (i.e., a multiplexer that is not adapted to insert QoS data 204) is illustrated. The CPE 106b of the embodiment of FIG. 3b utilizes QoS data 204 it generates on its own to enforce one or more QoS policies in the consumer premises portion of a cable network. This approach has, in comparison to that of the embodiment of FIG. 3a previously described, the advantage of obviating any QoS data profiling or generation function such as that of FIG. 2 herein, since the CPE 106b is tasked with providing this functionality.

Similar to the prior art, an MPTS 206 (comprised of several program content streams multiplexed together) is received at the CPE 106b by a tuner 302. As discussed elsewhere herein, the MPTS 206 received by the CPE 106b of FIG. 3b is not required to have (but may have) associated QoS data packaged therewith.

The MPTS 206 is transmitted within the CPE 106b to a demultiplexer 304. The demultiplexer 304 demultiplexes the MPTS 206 to individual SPTSs 208. In this embodiment, the demultiplexer 304 further comprises an algorithm adapted to pre-pend an internal time stamp 322 or other chronological and/or ordering reference (e.g., sequence number) onto each demultiplexed packet of the SPTS 208. Alternatively, such stamping can be performed on a per-GOP (group-of-pictures) header basis, or per-sequence header basis, or even yet other approaches recognized by those of ordinary skill given the present disclosure.

It will be appreciated that in another embodiment, the time stamp 322 is placed on the SPTS packets by an entity separate from the demultiplexer 304. Yet other configurations may be used consistent with the invention.

The multiple SPTSs 208 including time stamps 322 are then sent to a profiler process 324 within the CPE 320. The profiler 324 comprises a software process that reads the program mapping table (PMT) and program association table (PAT) of the SPTSs 208 to assemble a program map 328. The PMT and PAT are obtained for example from the in-band portion of the MPTS according to the requirements of the MPEG-2 specification (see e.g., INTERNATIONAL STANDARD ISO/IEC 13818-1, Second edition dated 2000 Dec. 1 entitled "Information technology—Generic coding of moving pictures and associated audio information: Systems", which is incorporated herein by reference in its entirety, although other approaches may be used with equal success. The profiler 324 also monitors each program stream 208 and compiles a running calculation of the QoS parameters 204 based on the time stamps 322. Accordingly, the profiler 324 periodically or situationally (e.g., upon a refresh command from another process, or upon the occurrence of another event of relevance to the QoS process) refreshes the QoS parameters 204 with newly acquired information. Per this embodiment, when a particular program is selected by a user, the profiler 324 assesses the QoS data 204' for the individual program stream 208' that is associated with the selected program. The QoS data 204' is used to configure the receiving apparatus 308 as required; e.g., setting proper buffer jitter parameters, retransmission requirements, throttling the data rate, etc. For example, in one variant, the data received at the CPE 320 would be processed with an assumed data rate and jitter parameters. The CPE would take the received data and create a "tspec" as described elsewhere herein, and subsequently request a certain class or set of QoS parameters from the network.

Then, the SPTS 208' is output to a configured receiving apparatus 308 (having an appropriate content decoder and/or display element). Again, it will be noted that a decryptor or a resource manager of the type previously referenced herein may be adapted to perform one or more of the abovementioned functions.

The QoS information 204 may comprise information such as for example minimum, maximum and nominal (average) bandwidth utilized for each program stream, or other information relating to the transport properties of the individual program streams 208 such as delays (and delay variation), jitter, dropped or lost packets, buffer size/depth, minimum, maximum, or nominal bitrate, etc. In one embodiment, which will be discussed in detail below, the QoS information 204 is of a type similar to that utilized for universal plug and play (UPnP) QoS.

Further, aside from being generated via an internal derivation mechanism (i.e., within the multiplexer 200 of FIG. 2, or CPE 106b of FIG. 3b), the QoS data 204 may be entered from via a channel to an external source (not shown) such as a third party content profiler, MSO upstream pre-processing unit, etc. The channel might comprise, e.g., a direct hardwired data interface using a packetized protocol interface (such as via a conventional Ethernet, USB, IEEE-1394, or similar interface), a wireless interface (such as 802.11, UWB, 3G/UMTS, WiMAX, millimeter wave, satellite, wireless USB, etc.), or optical fiber interface. Alternatively, the data may be received via off-line communication means such as human operator typing or loading information at a headend or hub, from a storage media such as a CD-ROM, HDD or RAID array, etc. Myriad different configurations for effectively generating and/or communicating data will be recognized by those of ordinary skill provided the present disclosure.

It also will be appreciated that the aforementioned QoS information 204 may be transmitted in the form of human and/or machine-readable metadata (such as XML) of the type well known in the networking arts. Generally speaking, "metadata" comprises extra data not typically found in typical primary content (or at least not visible to the users of the network). For each component of primary content (e.g., video/audio program stream) and/or advertising, one or more metadata files may be included that specify the relevant QoS and/or transport-related data for that content. This metadata can be provided with the content from its source or provider (e.g., a network studio or station, advertiser, third party marketing firm, etc.), or alternatively added by the network operator/MSO. Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

For example, in one variant, a generalized (standardized) metadata syntax is used to promote interoperability between the components/processes of various service providers. Alternatively, a proprietary syntax may be utilized for all or part of the data, thereby assuring interoperability only between equipment and processes of one system operator. This data can also be protected using any number of well known security techniques, including security mechanisms within the physical or link layers of the indigenous transport channel used to carry the data, session layer security, IPSec or VPN tunneling, application layer encryption, and so forth.

Both CPE 106a, 106b of FIGS. 3a and 3b respectively generally comprise an OpenCable (OCAP)-compliant embedded system having an RF front end (including tuner 302 and demultiplexer 304) for interface with the HFC network 101 of FIGS. 1-1c, although this is by no means a requirement for practicing the invention. The CPE 106a, 106b also comprise a plurality of internal components (deleted from the figures for simplicity) including digital processor(s), storage devices, and a plurality of interfaces (e.g., video/audio interfaces, IEEE-1394 "Firewire", USB, serial/parallel ports, etc.) for interface with other end-user apparatus such as televisions, personal electronics, computers, WiFi or other network hubs/routers, etc. Further, the CPE each also may comprise other components which can be utilized within the device various processing layers (e.g., DOCSIS MAC or DAVIC OOB channel, MPEG, etc.) as well as media processors and other specialized SoC or ASIC devices. The CPE may also comprise extra tuners and an integrated HD decoder, thereby relieving any connected monitors or other devices from the requirement of having such tuners or decoder. These additional components and functionality are well known to those of ordinary skill in the cable and embedded system fields, and accordingly not described further herein.

The CPE 106a, 106b of FIGS. 3a and 3b respectively are also optionally provided with an OCAP 1.0-compliant application and Java-based middleware which, inter alia, manages the operation of the device and applications running thereon. It will be recognized by those of ordinary skill that myriad different device and software architectures may be used consistent with the functions of the present invention, the devices of FIGS. 3a and 3b being merely exemplary. For example, different middleware (e.g., MHP, ARIB, or ACAP) may be used in place of the OCAP middleware of the illustrated embodiment.

The exemplary CPE further each comprise a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality needed to support the QoS manager application 604 (see FIG. 6).

In another embodiment, the CPE comprise converged premises devices, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. Specifically, in one embodiment of this converged device, a "QoS manager" is utilized which can receive a request from another device, and utilize the aforementioned tspec to provide inter alia enhanced QoS and bridging capabilities (e.g., to devices or networks which are not part of the MSO network).

Moreover, the foregoing embodiments of the CPE may utilize any number of other methods and apparatus in conjunction with the functionality previously described herein in order to further extend its capabilities. See, e.g., co-owned and co-pending U.S. patent application Ser. No. 10/723,959 filed Nov. 24, 2003 entitled "METHODS AND APPARATUS FOR HARDWARE REGISTRATION IN A NETWORK DEVICE"; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and U.S. patent application Ser. No. 10/782,680 filed Feb. 18, 2004 entitled "MEDIA EXTENSION APPARATUS AND METHODS FOR USE IN AN INFORMATION NETWORK", each of the foregoing incorporated herein by reference in its entirety. Myriad other combinations and variations of the CPE 106a, 106b will also be recognized by those of ordinary skill given the present disclosure.

Additionally, while shown and described in a functional block diagram context, the various components of the CPE 106a, 106b discussed above may comprise software processes (e.g., distributed applications (DAs) or the like), firmware, hardware, or any combination of the foregoing. Hence, the figures are merely exemplary in nature, and not determinative of any particular implementation.

It will be recognized that while two different embodiments and QoS data generation paradigms are described herein, these two embodiments/paradigms are not necessarily inconsistent with one another or network equipment that is non-QoS capable under the present teachings, and may in fact be used within the same network. For example, a headend or hub multiplexer of the type described in FIG. 2 (i.e., that generates and inserts QoS data into the MPTS) can none-the-less deliver content and the very same MPTS to a CPE 106 which is not equipped to extract QoS data. The QoS data merely goes un-utilized, since the CPE is not equipped to extract or utilize it.

Similarly, the same MPTS with QoS data can be delivered to a CPE 106b of the type shown in FIG. 3b (i.e., one which extracts its own QoS data); the mux-generated QoS data is merely ignored, or alternatively can be used for comparison/error correction purposes, or in the event the CPE internal QoS data generation infrastructure fails or otherwise becomes ineffective.

Accordingly, the various configurations and delivery paradigms of the invention can be freely intermixed with one another on the same network, and moreover these can be freely intermixed with extant CPE and multiplexer configurations (i.e., that do not have QoS data generation capability), thereby providing the MSO with a great degree of flexibility in the introduction and implementation of the present invention within various portions of the existing network. Additionally, CPE of the first type (i.e., those adapted to extract upstream-generated QoS data as in FIG. 3a) can be readily converted into CPE of the second type (i.e., FIG. 3B) and vice versa with minimal software/firmware/hardware changes (or simply by sending a given subscriber a new box). In another variant, the configuration of the customer's CPE can be switched between the embodiments of FIGS. 3A and 3B via a downloaded software/firmware change, which may be installed such as upon the next reboot, at a prescribed time (e.g., late at night), etc., thereby allowing the MSO to completely obviate any service calls to the customer's premises. The device can also be remotely provisioned as necessary using such techniques.

Exemplary Methods—

Figure 4:
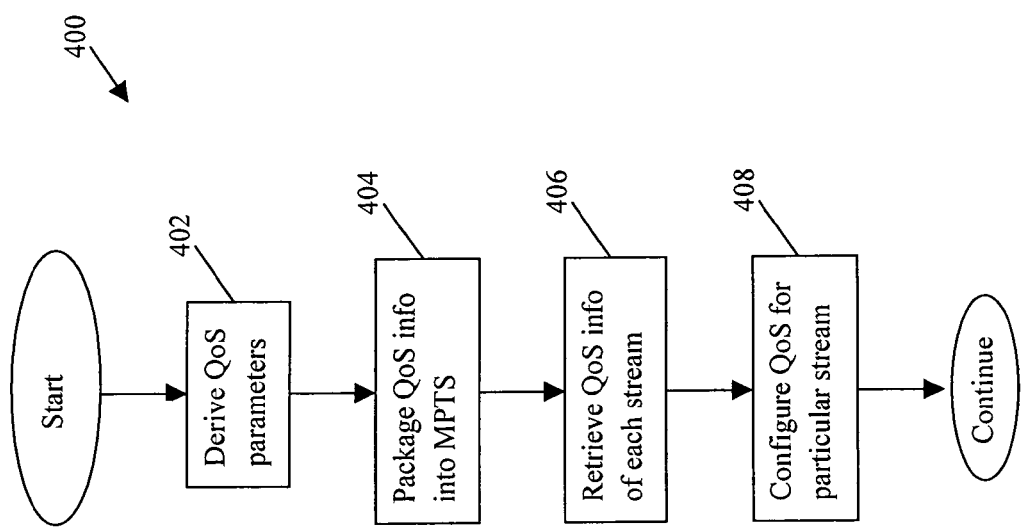
FIG. 4 is a logical flow diagram of an exemplary method of utilizing QoS data with statistical multiplexing to ensure QoS according to the present invention.
Figure 5:
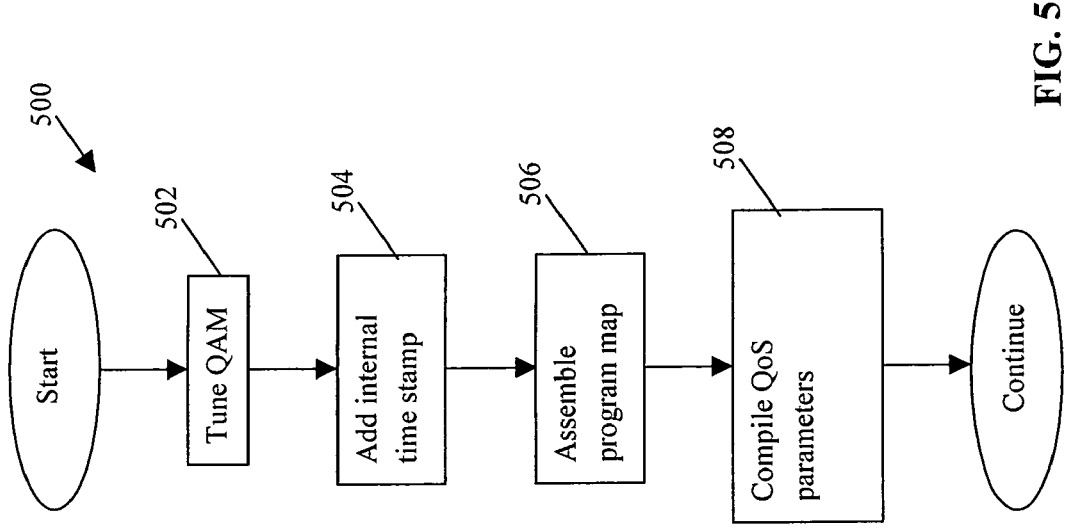
FIG. 5 is a logical flow diagram of a second exemplary method of utilizing QoS data and statistical multiplexing to ensure QoS according to the present invention.

Referring now to FIGS. 4-5, exemplary embodiments of the methods of assuring Quality of Service (QoS) within the CPE 106 according to the present invention are described in detail. The method 400 of FIG. 4 utilizes the abovementioned exemplary multiplexer 200 of FIG. 2 adapted to attach QoS data 204 to the MPTS 206, as well as the exemplary CPE 106*a* of FIG. 3*a* which is adapted to utilized the attached QoS data 204 to enforce QoS policy, whereas the method 500 of FIG. 5 utilizes a typical prior art multiplexer 162 and a CPE 106*b* adapted to generate QoS data 204 on its own, such as the CPE 106*b* of FIG. 3*b* above.

FIG. 4 illustrates a first exemplary method 400 whereby statistical multiplexing is used to enforce QoS policy according to the present invention.

At step 402, the statistical multiplexer 200 (FIG. 2) is utilized to derive and insert QoS parameters 204 for one or more of the program streams 202 that will be placed in the MPTS 206. However, it will be appreciated that a separate entity or entities may be responsible for deriving QoS parameters 204 and/or placing the QoS parameters 204 on the MPTS 206, as previously described. The QoS parameters 204 tracked may include inter alia, (i) maximum or peak bandwidth necessary for the program stream, minimum bandwidth utilized by the program stream, nominal or average bandwidth, jitter delay, buffer depth (i.e., how deep the buffer should be set in terms of time so as to accommodate the aforementioned delay without significant numbers of lost packets), and other general transport properties.

Figure 4A:
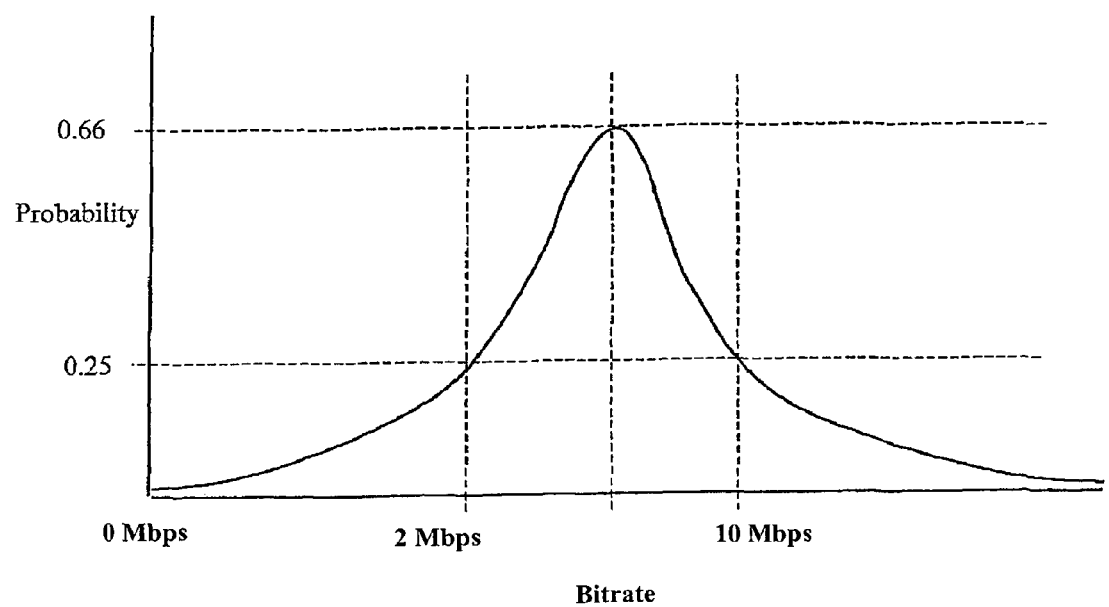
FIG. 4a is a graphical representation of an exemplary bitrate versus probability distribution for a content stream useful with the QoS architecture of the present invention.

It will also be recognized that the QoS data may take the form of statistical data relating to the program stream(s). For example, in one variant, the QoS data comprises a statistical or probability distribution of bitrate as a function of time; e.g., less than 2 Mbps for 20% of the total duration, 2-5 Mbps for 27% of the total duration, etc. See also the exemplary distribution of FIG. 4*a*. The temporal placement of the various portions of the statistical distribution within the program stream may also be provided (e.g., seven (7) peaks of 15 Mbps or greater located at time stamps $X_1, X_2 \ldots X_7$, etc.). This type of data tells the entity using the data (e.g., CPE 106*a*) the relative weights of the various bitrates, which can be of significant interest in implementing the QoS policy. For instance, if a program stream is heavily weighted toward lower bitrates, but has a few maximum peaks that are comparatively high in bitrate, the CPE 106*a* may use this information to schedule various activities, since it knows when such peaks will occur. Duration information can also be provided (e.g., the seventh peak exceeds 15 Mbps for 12 seconds). Literally any type of data which characterizes the attributes of the program stream may be used consistent with the invention.

The statistical multiplexer 200 may be adapted to derive these QoS parameters 204 over a defined time period (e.g., the entire duration of the content, or portions thereof such as every 5 seconds of content), including either before, during or after multiplexing the program streams 202 into an MPTS 206, depending on the type of multiplexing process utilized (e.g., open-loop, closed-loop, etc.), or rate shaping/transrating performed. Further, as described above, the multiplex operation may not necessarily occur at the headend 150. Rather, it is of note that the abovementioned step 402 may be performed at any capable entity no matter where located, for example at a BSA node or hub (see discussion of FIG. 1*c* provided above).

Per step 404, the QoS parameter data 204 is next packaged into the multi-program transport stream (MPTS) 206 by the multiplexer 200. It will be noted that in one preferred embodiment, the QoS data 204 is made to conform to an open standard of parameters which individual statistical multiplexer vendors can implement (e.g., a commonly adopted protocol). In one variant, the QoS data 204 is placed on the MPTS 206 by incorporation of the data into a designated "private section" within an assigned PID of the type well known in the art. Alternatively, a private PID may be assigned for each program rather than incorporating the information onto the MPTS 206 as a whole. The MPTS 206 is subsequently distributed over the network.

At step 406, one or more CPE 106*a* adapted to utilize the MPTS 206 having associated QoS data 204 receives the MPTS 206 (having associated QoS data 204) by utilization of a tuner 302 tuned to the appropriate QAM. Once the MPTS 206 is received at the CPE 106*a*, the PID filter 306 of the demultiplexer 304 within the CPE 106*a* (FIG. 3*a*) is able to use information stored in the program mapping table (PMT) and the program association table (PAT) to obtain the QoS parameter PID. The demultiplexer 304 opens the QoS profile derived by the statistical multiplexer 200 (or other entity), and is able to acquire the QoS data 204 of each individual program stream 208 present in the MPTS 206.

Finally, at step 408, the CPE 106*a* uses the QoS information 204 to configure a receiving apparatus 308 or the CPE itself (depending on configuration) for the QoS policy of the particular stream 208' selected.

FIG. 5 illustrates a second exemplary method 500 according to the invention, whereby a statistically multiplexed content stream 206 is used to enforce QoS policy according to the present invention.

At step 502, a CPE 106*b* (such as that of FIG. 3*b*) utilizes the tuner 302 to tune a QAM; the MPTS 206 associated with that QAM will thereby be received by the CPE 106*b*, and the internal demultiplexer 304 of the CPE demultiplexes the incoming MPTS 206 to its component single program transport streams 208.

At step 504, the demultiplexer 304 also monitors the several component SPTSs 208 which are derived from the received MPTS 206. The demultiplexer 304 affixes an internal time stamp 322 to each program stream packet 208 (or GOP header, sequence header, etc. as previously discussed).

Per step 506, a profiler 324 within the CPE 106*b* reads the PMT and PAT, and assembles a program map 328. The program map 328 includes identifying information regarding the single program streams 208 in the MPTS 206.

At step 508, the QoS profiler 324 monitors each program stream 208, and compiles a running calculation of the QoS parameters 204 based on the time stamps 322. It will be appreciated that the term "running calculation" as used herein includes situations where the QoS is configured to collect and process data from the stream(s) to generate the QoS data on-the-fly, as well as those where the data extraction/collection and processing to generate the final QoS data are done at separate times. For instance, the QoS profiler may be tasked with obtaining the necessary raw data from the stream, and a separate logical process (e.g., resource or policy manager) running on the CPE with processing the raw data to derive useful QoS data.

Finally, at step 510, when a particular video stream is requested, the QoS data 204' for that individual program stream 208' is retrieved from the profiler 324. The QoS data 204' is used to configure a receiving apparatus 308, and the program stream 208' is then delivered.

It will be appreciated that the above mentioned methods are merely exemplary in nature and do not represent an exhaustive list of the methods by which a content-based network may utilize multiplexed program streams to ensure quality of service. Other methods (not shown) are appreciated by the foregoing disclosure and are hereby incorporated. For example, as previously noted, the QoS data may be derived from data obtained via a separate communication channel (e.g., not necessarily received via an in-band PID or the MPTS, such as via a DOCSIS or OOB channel), and may also comprise metadata of the type described above.

Exemplary QoS Software Architecture (UPnP)—

Figure 6:
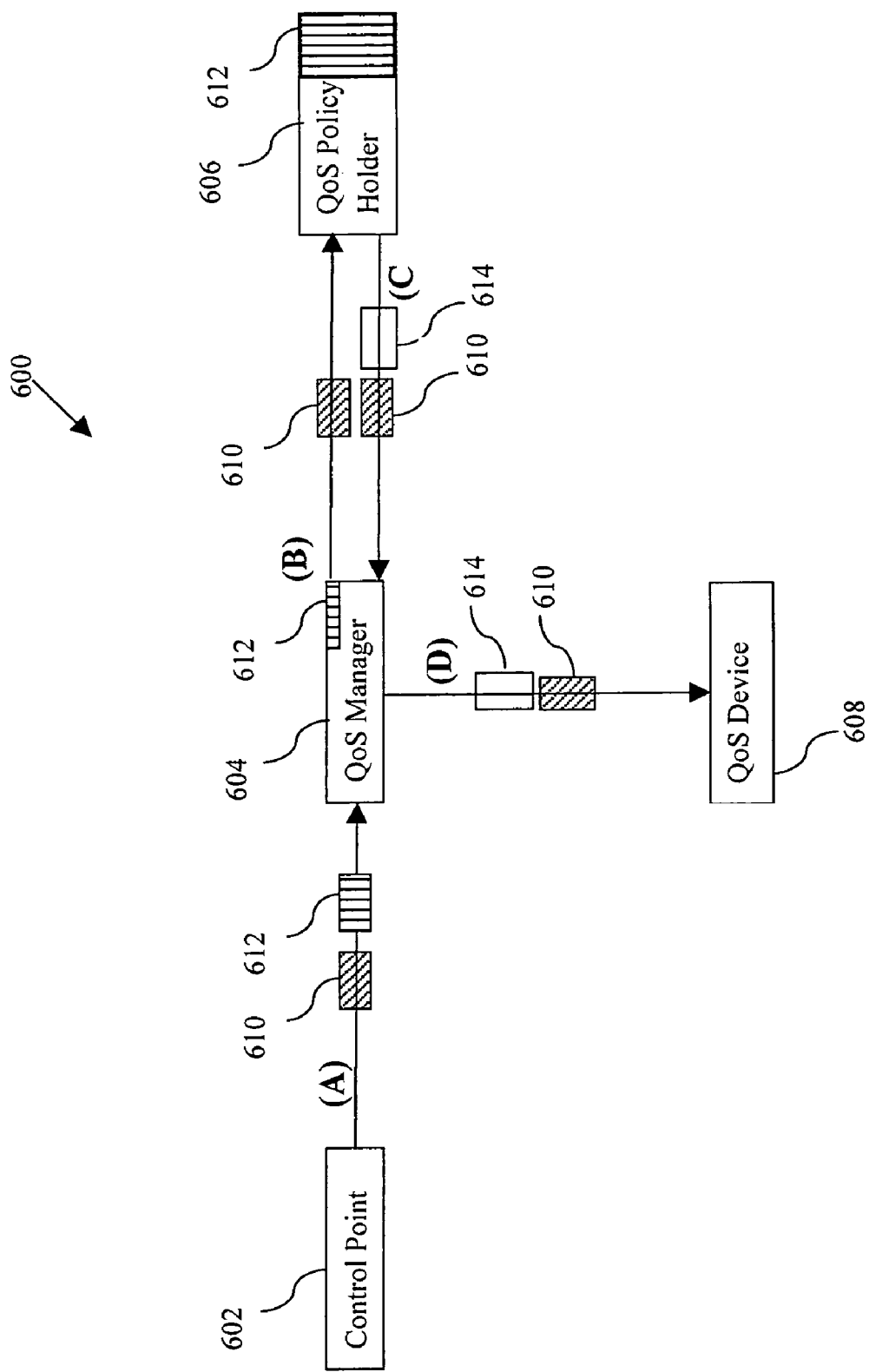
FIG. 6 is a functional block diagram of an exemplary QoS software architecture according to the present invention.

Referring now to FIG. 6, an exemplary QoS software architecture 600 according to the invention is described in detail. The overall architecture 600 of the QoS implementation of this embodiment, and the interaction between the various components is purposely similar to that described with regard to the UPnP QoS Framework as set forth in the UPnP DCPs previously incorporated herein.

UPnP audio-visual (AV) technology effectively defines two AV devices, a media server and a media renderer. In a typical configuration, a UPnP user is able to browse the AV media items stored on the media server (including those available for transmission from the media server), select specific items, and cause those items to be played on the media renderer. In order to provide a uniform mechanism for media rendering devices to browse the AV media items available from a media server (and to obtain information about individual items), a Content Directory Service (CDS) is defined in the UPnP media server. The CDS provides a mechanism by which the media server can publish a listing of the media items, along with related metadata (such as a UPnP Traffic Descriptor), for each media item.

In the UPnP context, the QoS parameters are contained in the UPnP Traffic Specification ("tspec"). A tspec may include parameters such as Traffic ID, and traffic characteristics like peak rate, mean rate, delay requirements, and loss requirements. A tspec is commonly represented in the form of an XML structure in the CDS. In the present embodiment, the tspec XML is extracted from the "CDS" (here, the QoS profiler of FIG. 2, the QoS Policy Server of FIG. 7 described subsequently herein, or a similar entity), and inserted into the QoS descriptor data associated with the relevant program stream.

The CPE 106 receives the QoS descriptor data as previously described, which describes the traffic stream structure and which includes the QoS parameters in the tspec, and applies the appropriate QoS policy for that data. The QoS policy may be obtained from an optional QoS Policy Service, which can be controlled by the MSO or even the network subscriber, or according to a "default" QoS policy applicable to that premises or delivery channel. The QoS policy may include for example the relative importance of a particular traffic stream (such as via a TrafficImportanceNumber and a UserImportanceNumber). The CPE provides these parameters to the receiving apparatus 308, and a QoS service process in each such apparatus configures the device for processing the traffic according to the policy. The TrafficImportanceNumber is used inter alia to determine the technology-specific access priority, such as by tagging the packets to be transmitted to the receiving apparatus 308 from the CPE receiving the MPTS.

Figure 6A:
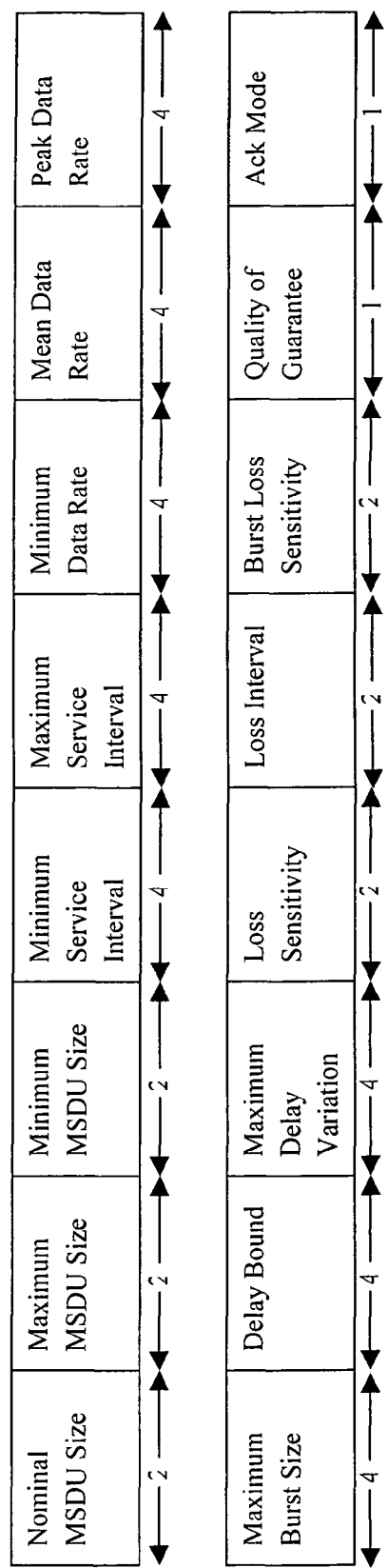
FIG. 6a is an illustration of exemplary traffic specification parameters.

On exemplary implementation of the foregoing UPnP tspec concept to a content-based (e.g., cable) network is now described in detail with respect to FIGS. 6 and 6a. It is of note however, that other implementations and architectures may be utilized consistent with the present invention. Moreover, while the below-described exemplary architecture 600 requires a translation of the parameters associated with a program stream (e.g., bandwidth requirements) to a form compatible with the UPnP tspec, such translation may be obviated if desired, such as by using parameters that or indigenously consistent with the UPnP tspec.

According to the embodiment of FIG. 6, a control point 602 contains relevant QoS information regarding the program streams. The control point 602 utilizes the tspec regarding the individual content streams to construct the traffic descriptor 610 (discussed in greater detail below). As previously noted, the tspec contains a set of parameters that define the characteristics of the traffic stream; FIG. 6a depicts exemplary tspec parameters (for detailed description of these parameters, see "UPnP QoS Architecture: 1.0" dated Mar. 10, 2005, and "UPnP QoS Architecture: 2" dated Oct. 16, 2006, previously incorporated herein). The parameters depicted represent the mandatory tspec parameters; however, it will be appreciated that more or less of these parameters may be utilized consistent with the present invention (the latter in no way being limited to compliance with the UPnP tspec requirements).

In one variant, the control point 602 comprises a headend or hub multiplexer 200, such as that of FIG. 2 above. As previously discussed, the multiplexer 200 evaluates the several program content streams 202 for placement on the multi-program transport stream 206. While doing so, the multiplexer 200 may also generate a traffic descriptor 610 for each individual content stream 202. In an alternative embodiment, the profiler 324 of an adapted CPE 106b such as that of FIG. 3b, may generate a traffic descriptor 610 from information which it collects based on time stamps 322 placed on the demultiplexed content stream 208.

Next, the control point 602 sends a request (A) containing the newly-constructed traffic descriptor 610 to a QoS manager (QM) 604. The QoS manager generally comprises a computer application adapted to run on a CPE 106, although it will be appreciated that other configurations and/or implementations may be utilized consistent with the present invention. The control point 602 may optionally include a QoS policy holder identifier 612 in the request (denoted by point "A" in FIG. 6). The QoS policy holder identifier 612 is a marker which identifies for the QoS manager 604 the particular QoS policy holder 606 desired. (The QoS policy holder will be discussed in greater detail below.) Thus, the QoS policy holder identifier 612 is utilized by the QoS manager 604 to identify the appropriate QoS policy holder 606. The QoS policy holder 606 and the QoS manager 604 may advantageously be located within the CPE 106a, 106b. In an alternative embodiment, the QoS policy holder and QM comprise computer applications located as part of a resource manager (not shown) as described in co-owned, co-pending U.S. patent application Ser. No. 12/070,560 entitled "MULTI-STREAM PREMISES APPARATUS AND METHODS FOR USE IN A CONTENT-BASED NETWORK" previously incorporated herein. If the control point 602 does not specify a policy holder 606, the QoS manager 604 will search the local network for QoS policy holders 606. If no policy holders 606 are found, or if more than one policy holder 606 is found, the QoS manager 604 will apply a default traffic policy. Alternatively, if one QoS policy holder 606 has been found, or if the specified QoS policy holder 606 is identified, the QoS manager 604 will request (denoted by point "B" in FIG. 6) that the QoS policy holder 606 provide a traffic policy 614 for the traffic stream indicated by the traffic descriptor 610. In response, the QoS policy holder 606 will send (point "C: in FIG. 6) the traffic policy 614 associated with the traffic stream indicated by the traffic descriptor 610 back to the QoS manager 604.

The exemplary traffic policy 614 distributed by the QoS policy holder 606 may comprise information which is added to the tspec under the appropriate field. The traffic policy 614 in the present embodiment includes providing the aforementioned traffic importance number (traffic priority level or TrafficImportanceNumber) and a user importance number (e.g., UserImportanceNumber) to the tspec, which are most adequately placed in the "traffic class" field. Based on this policy 614, the QoS manager 204 will configure the QoS device 608 for receipt of the traffic stream (point "D").

It is noted that the QoS device 608 referred to in this example may comprise a CPE 106, or other receiving apparatus 308 described above. Although only one QoS device 608 is illustrated in FIG. 6, the use of more than one is contemplated by the present invention.

It will also be appreciated that other parameters, not depicted among the exemplary parameters of FIG. 6a, may be optionally included in the tspec, including inter alia, fields for the "traffic class", "AVTransportURI", "AVTransport InstanceID", etc. The "traffic class" field in particular is of note; it can be used for example to determine the total delay range. In the present invention, certain types of data transmitted may require a traffic priority level of "4" and above. If no traffic priority level is specified in the traffic class field, the total delay may exceed 5 ms by the specification. If the traffic priority level specified is 4, the total delay will not exceed 5 ms. If the traffic priority level specified in the traffic class field is "5" or above, the total delay must be less than 1 ms. Accordingly, different types of content may be evaluated and assigned different priorities based on inter alia how critical latency is to user experience and/or data reliability.

Network Device—

Figure 7:
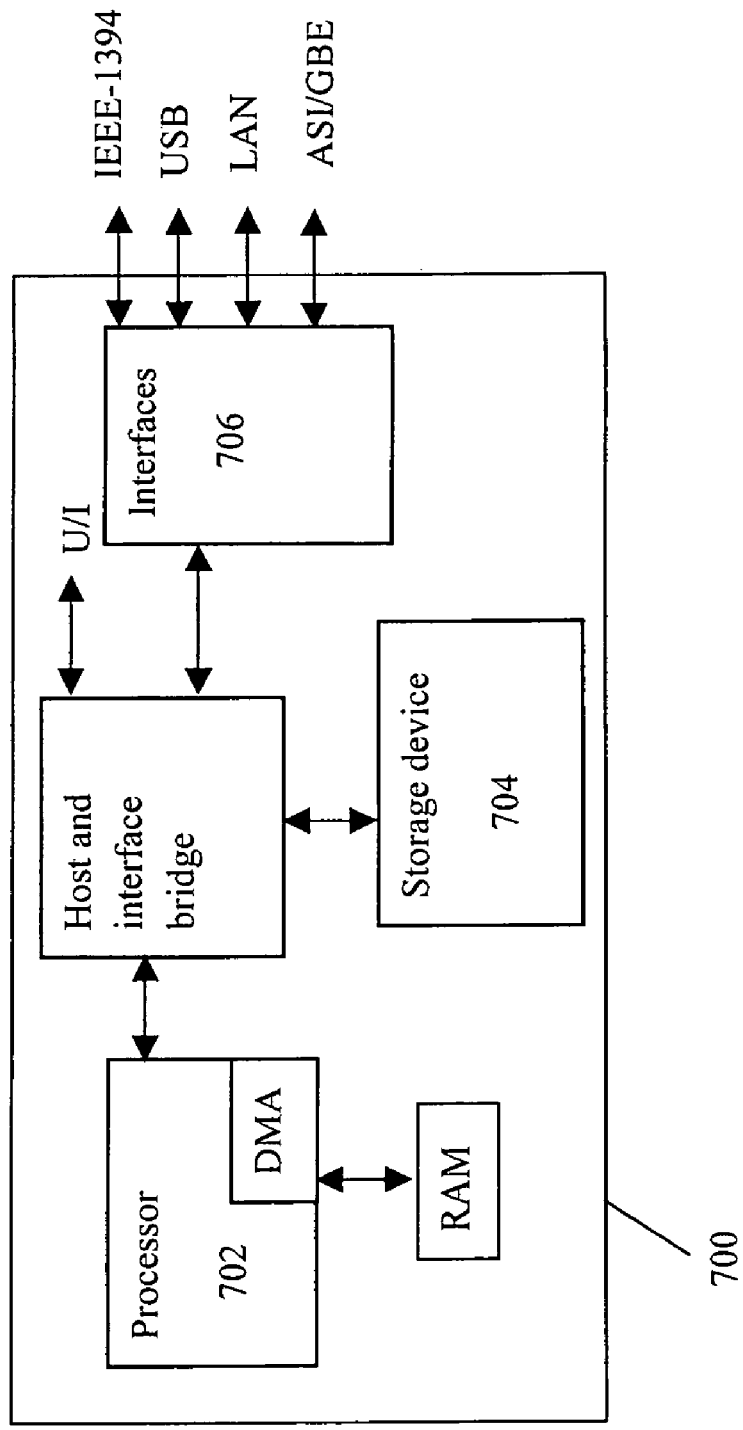
FIG. 7 is a functional block diagram of one exemplary embodiment of a network device adapted for QoS policy implementation according to the invention.

Referring now to FIG. 7, one embodiment of an improved network device (e.g., QoS CDS) device being adapted to retain various QoS policies according to the present invention is described. As shown in FIG. 7, the device 700 generally comprises and OpenCable-compliant network server or controller module adapted for use at the headend 150 or hub site(s) of FIGS. 1-1c, although the server may comprise other types of devices (e.g., VoD or application servers, SRM or other supervisory processes, etc.) within the network as previously described.

The device 700 generally comprises a digital processor(s) 702, storage device 704, and a plurality of interfaces 706 for use with other network apparatus such as RF combiners, IP routers and other packet network devices, network management and provisioning systems, local PCs, etc. Other components which may be utilized within the network device 700 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of policy interchange between the network device 700 and other entities within the network.

Software comprising the QoS CDS and/or policy holder functionality may also be disposed to run on the server module 700, and can be configured to provide a functional interface with the QoS manager 604 on the CPE 106, or other interposed or remote entities. These components and functionalities are well known to those of ordinary skill in the cable and embedded system fields, and accordingly not described further herein.

The device 700 of FIG. 7 may take any number of physical forms, comprising for example one of a plurality of discrete modules or cards within a larger network headend, edge or hub device of the type well known in the art. The server may also comprise firmware, either alone or in combination with other hardware/software components such as those previously described. Alternatively, the device 700 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The device 700 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. Alternatively, such computer programs may have one or more components distributed across various hardware environments at the same or different locations. As yet another example, portions of the functionality may be rendered as a dedicated or application specific IC having code running thereon. Myriad different configurations for practicing the invention will be recognized by those of ordinary skill in the network arts provided the present disclosure.

ALTERNATE EMBODIMENTS

Various alternative embodiments of the invention are now described, including those incorporating: (i) multi-stage multiplexing capability; and (ii) wideband tuner capability.

Multi-Stage Multiplexing—

In one variant, the above mentioned embodiments of the present invention may be utilized in conjunction with a multi-stage multiplexing system, including for example that of co-owned, co-pending patent application Ser. No. 11/048,334 entitled "APPARATUS AND METHODS FOR MULTI-STAGE MULTIPLEXING IN A NETWORK" previously incorporated herein, which discusses, inter alia, methods and apparatus for performing multiplexing of video or other content (e.g., programs) within a network using feed-back from a subsequent digital program insertion stage, and/or feed-forward information from a prior multiplexing stage. In one embodiment, the network comprises a hybrid fiber coax (HFC) cable network having headend and hub-based statistical multiplexing stages, and communication between the two stages is used to improve the visual quality performance and bandwidth utilization of the output multi-program stream during conditions where downstream content is inserted into the transport stream.

In one embodiment, the QoS performance required by a given policy would be enforced by insertion of QoS data 204 into the MPTS 206 at one or more of the multiple multiplexer stages of the multi-stages configuration. Additionally, the QoS data generated at say a first (upstream) stage of the multi-stage architecture could be passed downstream to a subsequent mux stage, allowing that subsequent stage to make additional corrections or compensation for secondary content inserted locally (i.e., downstream of the upstream mux).

Wideband and Multi-QAM Variants—

While the foregoing embodiments of the present invention are described primarily in terms of an infrastructure adapted to transmit content over a single physical channel (e.g., 256-QAM modulated carrier) at any given time, it will be recognized that this "physical channel" may actually comprise one or more distinct carriers. For example, in one multi-carrier variant of the invention, the content is streamed over multiple physical carriers according to a multiplexing algorithm such as that described in co-owned and co-pending U.S. patent application Ser. No. 11/013,671 filed Dec. 15, 2004 and entitled "METHOD AND APPARATUS FOR WIDEBAND DISTRIBUTION OF CONTENT", incorporated herein by reference in its entirety. Under this approach, the MPTS, and associated QoS data 204 of that transport stream, can be multiplexed across a plurality of physical carriers, with the multiplexed signal being reassembled at the CPE 106*a*, 106*b* using a wideband tuner (or a plurality of related tuners). Information from the headend as to the multiplexing scheme and channels used may be provided to the CPE (and intermediate nodes such as the network hubs 104 if desired) in order to enable de-multiplexing (and decoding) of the multiplexed transport stream 206. Hence, for the purposes of the present invention, the aggregation of multiplexed channels acts like a single QAM.

In fact, selectively distributing one or more MPTSs across two or more QAMs may have an impact on the QoS provided to downstream nodes of the network, and hence one variant of the invention allows for dynamic selection and switching between uni- and multi-QAM transmission based on, inter alia, feedback from the CPE 106 or another downstream entity (e.g., switching hub) as to actual QoS performance. For instance, where a uni-QAM approach is being used, and certain types of congestion or degradation in QoS (either temporal or reliability) are being experienced, one strategy may be to switch to a multi-QAM transmission scheme, thereby hopefully improving the multiplexing statistics associated with the transport(s). Specifically, one salient benefit obtained by implementing the aforementioned multi-QAM technique relates to the increase or enhancement in the size of the "pool" available to the HD statistical multiplex processes of the head-end. An increased number of variable rate content streams can be included in a multiplex, and the multiplex can be distributed over multiple different carriers, which collectively makes the statistical multiplexing process more effective.

Business Methods and "Rules" Engine—

It will be readily appreciated that various aspects of the present invention lend themselves to the creation of new business models, wherein network operators, content and advertisement providers, consumers, or other entities can provide or be provided differentiation in the type or quality of service via the interaction of the various network multiplexing elements and processes.

For example, in one exemplary business model of the invention, the network operator can assure maintenance of the quality of a certain program by transmitting with it relevant QoS data 204. Consumers, etc. may exchange increased consideration (such as higher subscription fees) for this assurance. Maintenance of quality may also be ensured by providing consumer equipment (for example, CPE 106*a*, 106*b* of FIGS. 3*a* and 3*b* respectively) which is adapted to utilize and/or generate QoS data 204 on its own. Utilization of the QoS data 204 will largely insulate the particular program from events that may potentially reduce its quality. This can be applied on a network-wide, per-hub, or even per-CPE basis as desired. This protection can also be applied on a temporal or per-user channel basis; e.g., during certain periods of the programming day or on certain user channels (or physical channels for that matter), the program quality or other metric may be insulated from degradation based on an evaluation of the QoS data 204 transmitted. For example, it may be desirable to maintain zero loss of quality policy during certain periods of transmission of standard definition (SD) or high definition (HD) programming.

Content providers may also pay additional consideration for assurances that QoS will be maintained as part of the delivery of their content; subscribers experiencing degraded quality may for whatever reason ascribe the "fault" with the content source (e.g., NBC or CBS) versus the MSO, thereby tarnishing that source's image in the mind of the subscriber. Hence, assurances of QoS for their content largely alleviates this concern for the content source.

Additionally, content sources (or other MSOs) may be willing to pay for VBR or other QoS profiling data. Outside the context of the present invention, such data may have value to other types of end-users such as portable media device (PMD) manufacturers or UPnP "renderer" manufacturers on which the content will ultimately be played, such as for device power management, bitrate/codec configuration, or other such considerations within the PMD.

In another aspect of the invention, the aforementioned software processes (including the QoS profiler (to include the statistical multiplexing algorithms), QM, and/or policy server) optionally include an operations and/or business rules engine. This engine comprises, in an exemplary embodiment, a series of software routines running on e.g., the network device 700 of FIG. 7 or other associated hardware/firmware environment that are adapted to control the operation of the QoS policy implementation previously described. These rules may also be fully integrated and controlled via e.g., a GUI on a PC connected to the network device 700 or CPE 106. In effect, the rules engine comprises a supervisory entity which monitors and selectively controls the QoS functions at a higher level, so as to implement desired operational or business rules.

The rules engine can be considered an overlay of sorts to the algorithms of the software applications previously described. For example, the application running on the QoS profiler, QoS policy holder/server module 700 may invoke certain operational protocols or decision processes based on data received from the CPE 106*a*, 106*b* (e.g., historical activity data, subscriber preferences, etc.), as well as network operational or historical data (e.g., relating to actual latency or delay, bandwidth consumption, etc.), demographic data, geographic data, etc. However, these processes may not always be compatible with higher-level business or operational goals, such as maximizing profit on a network-wide basis (or after consideration of other factors not input to the network server module 700 algorithms, such as "costs" of delivering streams based on required bandwidth, taxes, maintenance or repair costs, additional equipment leasing or use costs, etc.), or system reliability and/or flexibility. Moreover, the server module 700 may be operating on a per-CPE or per-request basis (i.e., evaluating the QoS policy or performance of each individual CPE effectively in isolation, and generating QoS policy and decisions without considering larger patterns or decisions being made in the service group or network as a whole). Hence, when imposed, the business/operational rules can be used to dynamically (or manually) control the operation of the sever module 700 (and/or CPE 106*a*, 106*b* QoS-related processes), in conjunction with the QoS policies which should be enforced per the functions previously described.

Furthermore, in another embodiment, a business rules engine of the type described in co-owned and co-pending U.S. patent application Ser. No. 10/881,979 filed Jun. 29, 2004 and entitled "METHOD AND APPARATUS FOR NETWORK BANDWIDTH ALLOCATION" incorporated herein by reference in its entirety can be used, although other approaches and configurations may be used with equal success. Such an engine might comprise one or more software processes running coincident with the aforementioned statistical multiplexing processes and adapted to control the upstream and/or downstream statistical multiplexing processes in order to impose various business-related rules to, e.g., maximize profit, increase user-satisfaction, provide selective promotions or other premium services within select geographic areas, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Consumer premises equipment (CPE), comprising:
a tuner configured to receive a multiplex, said multiplex comprising a plurality of content elements and descriptive data relating to at least one aspect of at least one content element;
a demultiplexer comprising a program ID (PID) filter configured to locate and retrieve said descriptive data relating to said at least one aspect of said at least one content element; and
a processor element, said processor element configured to utilize said descriptive data relating to said at least one aspect of said at least one content element to implement at least one quality of service (QoS) policy for playback of said at least one content element by said CPE.

2. The CPE of claim 1, wherein said tuner comprises a wideband tuner configured to receive a plurality of different multiplexed transports distributed across multiple radio frequency (RF) channels.

3. The CPE of claim 1, wherein said descriptive data further comprises bandwidth requirement information of said at least one content element.

4. The CPE of claim 1, wherein said descriptive data further comprises transport information of a multiplexed transport stream carrying said at least one content element.

5. The CPE of claim 1, wherein said descriptive data further comprises picture quality or resolution data for said at least one content element.

6. The CPE of claim 1, wherein said processor element comprises an integrated circuit having a computer program capable of running thereon.

7. The CPE of claim 1, further comprising a data interface to a personal media device (PMD), said PMD configured to render said at least one content element according to said at least one QoS policy.

8. The CPE of claim 1, wherein said at least one QoS policy comprises a universal plug and play (UPnP)-compliant QoS policy.

9. A method of operating a consumer device in a content delivery network, comprising:
receiving at least one output multiplex comprising at least in part a plurality of content elements;
demultiplexing said at least one output multiplex into a plurality of demultiplexed content elements;
downloading at least one application at said consumer device;
affixing time stamps to respective ones of packets within at least one of said demultiplexed content elements;
utilizing said time stamps to evaluate at least one aspect of said demultiplexed content elements;
generating data based at least in part on said evaluating, said data comprising at least quality of service (QoS) parameters for individual ones of said demultiplexed content elements; and
utilizing said data to configure said consumer device according to one or more parameters in order to provide said QoS policy for at least one of said demultiplexed content elements;
wherein said at least one application downloaded to said consumer device is configured to enable said consumer device to perform at least said acts of generating said data, and utilizing said data.

10. The method of claim 9, wherein said act of evaluating at least one aspect of said plurality of demultiplexed content elements comprises evaluating bandwidth requirements of said plurality of demultiplexed content elements.

11. The method of claim 9, wherein said at least one application downloaded to said consumer device comprises a firmware update configured to activate at a predetermined time after said download.

12. The method of claim 9, wherein said evaluated aspect of said demultiplexed content elements comprises a transport property of at least one of said demultiplexed content elements.

13. The method of claim 12, wherein said evaluated transport property enables compensation of jitter during said act of receiving said output multiplex.

14. A method of operating a consumer premises equipment (CPE), comprising:
receiving a multiplex comprising a plurality of content elements and descriptive data relating to at least one aspect of at least one content element;
demultiplexing said multiplex, via a demultiplexer comprising a program ID (PID)-based apparatus configured to locate and retrieve said descriptive data relating to said at least one aspect of said at least one content element; and
utilizing said descriptive data relating to said at least one aspect of said at least one content element to implement at least one quality of service (QoS) policy for playback of said at least one content element by said CPE.

15. The method of claim 14, wherein said receiving comprises receiving, via a radio frequency (RF) tuner one or more different multiplexed transports distributed across a plurality of RF channels.

16. The method of claim 14, wherein said descriptive data further comprises a statistical time-distribution of bitrates for said at least one content element.

17. The method of claim 14, wherein said descriptive data further comprises jitter delay information for a multiplexed transport stream carrying said at least one content element.

18. The method of claim 14, wherein said descriptive data further comprises video quality data for said at least one content element.

19. The method of claim 14, wherein said at least one QoS policy comprises a universal plug and play (UPnP)-compliant QoS policy.

20. The method of claim 19, wherein said descriptive data comprises an UPnP traffic specification.

21. The method claim 20, wherein said UPnP traffic specification details one or more of: (i) a peak rate, (ii) a mean rate, (iii) delay requirements, and (iv) loss requirements.

22. A consumer device for use in a content delivery network, said consumer device comprising:
- a storage device;
- a network interface;
- a data processor in data communication with said network interface and said storage device, said data processor configured to run at least one computer program thereon, said at least one computer program comprising a plurality of instructions configured to, when executed:
  - receive, via said network interface, at least one output multiplex comprising at least in part a plurality of content elements;
  - demultiplex said output multiplex into a plurality of demultiplexed content elements; and
  - download, to said storage device, at least one application configured to enable said consumer device to:
    - affix time stamps to respective ones of packets within at least one of said demultiplexed content elements;
    - utilize said time stamps to evaluate at least one aspect of said demultiplexed content elements;
    - generate data based at least in part on said evaluation, said data comprising at least quality of service (QoS) parameters for individual ones of said content elements; and
    - utilize said data to configure said consumer device according to one or more parameters in order to provide said QoS policy for at least one of said demultiplexed content elements.

23. The consumer device of claim 22, wherein said at least one application downloaded to said consumer device comprises a firmware update.

24. The consumer device of claim 22, wherein said one or more parameters comprise a bandwidth requirement for said at least one of said demultiplexed content elements.

25. The consumer device of claim 22, wherein said evaluated aspect of said demultiplexed content elements relates to one or more transport properties of said demultiplexed content elements.

26. The consumer device of claim 25, wherein said one or more transport properties comprise one or more of (i) jitter parameters, (ii) retransmission requirements, and (iii) data rate throttling.

* * * * *